United States Patent
Kang

(10) Patent No.: US 12,177,706 B2
(45) Date of Patent: Dec. 24, 2024

(54) METHOD FOR REPORTING BEAM INFORMATION IN WIRELESS COMMUNICATION SYSTEM, AND APPARATUS THEREFOR

(71) Applicant: LG ELECTRONICS INC., Seoul (KR)

(72) Inventor: Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 484 days.

(21) Appl. No.: 17/610,668

(22) PCT Filed: May 14, 2020

(86) PCT No.: PCT/KR2020/006313
§ 371 (c)(1),
(2) Date: Nov. 11, 2021

(87) PCT Pub. No.: WO2020/231189
PCT Pub. Date: Nov. 19, 2020

(65) Prior Publication Data
US 2022/0256382 A1 Aug. 11, 2022

Related U.S. Application Data

(60) Provisional application No. 62/849,128, filed on May 16, 2019.

(51) Int. Cl.
*H04W 24/10* (2009.01)
*H04B 7/0408* (2017.01)
*H04B 7/0417* (2017.01)

(52) U.S. Cl.
CPC .......... *H04W 24/10* (2013.01); *H04B 7/0408* (2013.01); *H04B 7/0417* (2013.01)

(58) Field of Classification Search
None
See application file for complete search history.

(56) References Cited

U.S. PATENT DOCUMENTS

| | | | |
|---|---|---|---|
| 2018/0048358 A1 | 2/2018 | Li et al. | |
| 2021/0314801 A1* | 10/2021 | Zhang | H04B 7/065 |
| 2021/0337415 A1* | 10/2021 | Chen | H04B 7/0626 |
| 2022/0286175 A1* | 9/2022 | Matsumura | H04B 7/0888 |

OTHER PUBLICATIONS

OPPO, "Discussion on Multi-beam Operation Enhancements", R1-1906288, 3GPP TSG RAN WG1 Meeting #97, Reno, USA, May 13-17, 2019, see sections 2-3.

(Continued)

*Primary Examiner* — Scott M Sciacca
(74) *Attorney, Agent, or Firm* — BRYAN CAVE LEIGHTON PAISNER LLP

(57) ABSTRACT

Suggested are a method and an apparatus for reporting beam information in a wireless communication system. Specifically, the method performed by a terminal may comprise the steps of: receiving, from a base station, downlink control information for triggering beam reporting; receiving, from the base station, a resource related to beam reporting; and reporting, to the base station, first beam information or second beam information, on the basis of the resource related to beam reporting.

11 Claims, 18 Drawing Sheets

(56) References Cited

OTHER PUBLICATIONS

Intel Corporation, "Summary on SCell BFR and L1-SINR", R1-1905638, 3GPP TSG RAN WG1 Meeting #96b, Xi'an, China, Apr. 8-12, 2019, see section 2.3.
NTT Docomo, Inc. "Discussion on multi-beam enhancement", R1-1904967, 3GPP TSG RAN WG1 Meeting #96bis, Xi'an, China, Apr. 8-12, 2019, see section 5.2.3.
LG Electronics, "Discussion on multi-beam based operations and enhancements", R1-1906731, 3GPP TSG RAN WG1 Meeting #97, Reno, USA, May 13-17, 2019, see section 4.

* cited by examiner

[FIG. 1]
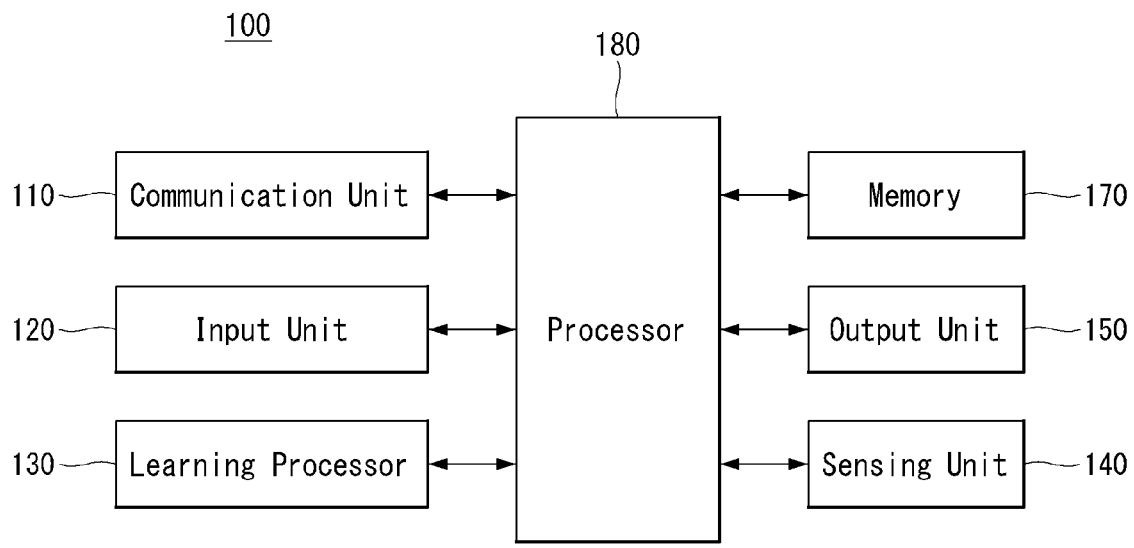
[FIG. 2]
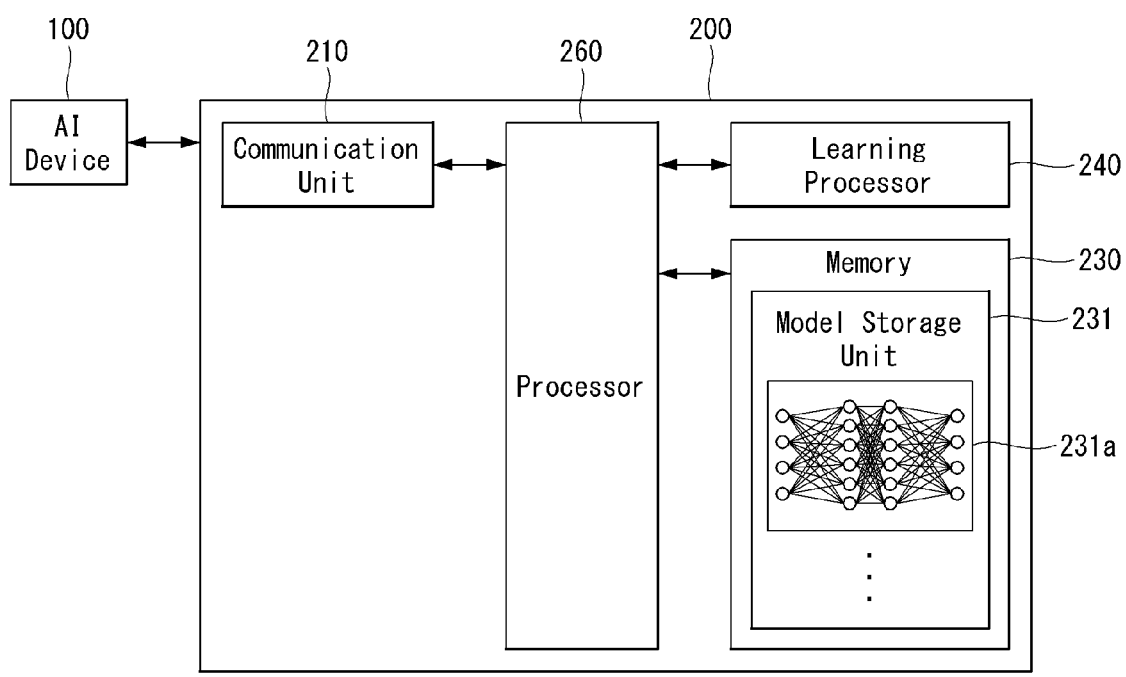

[FIG. 3]
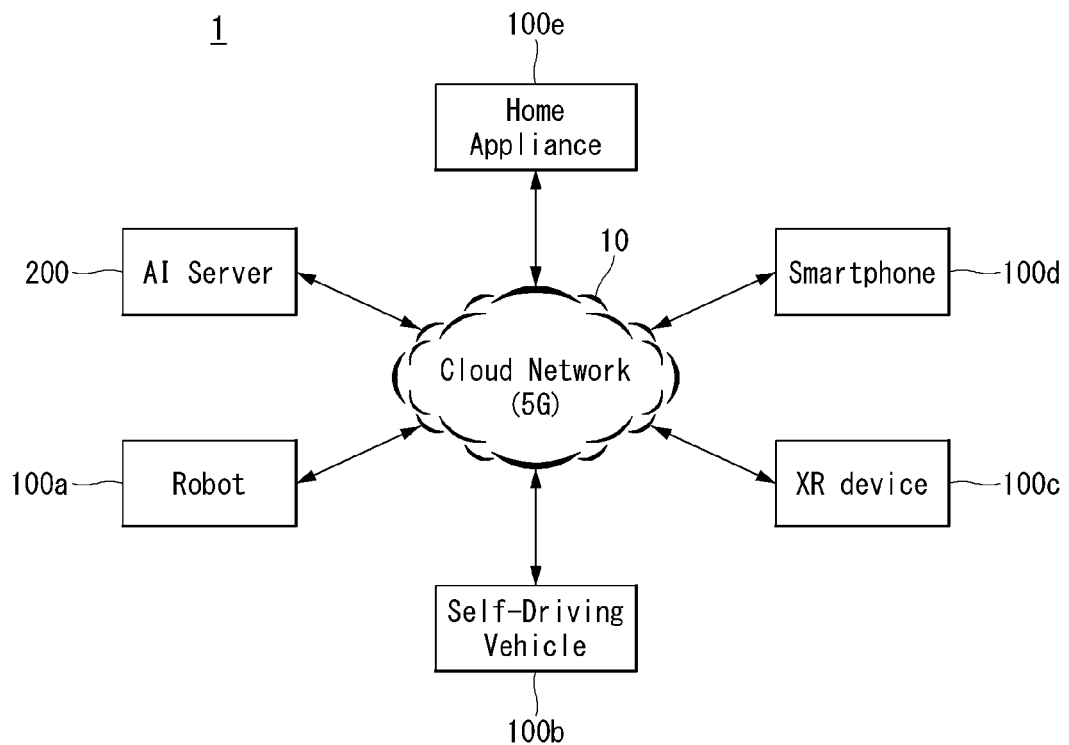

[FIG. 4]
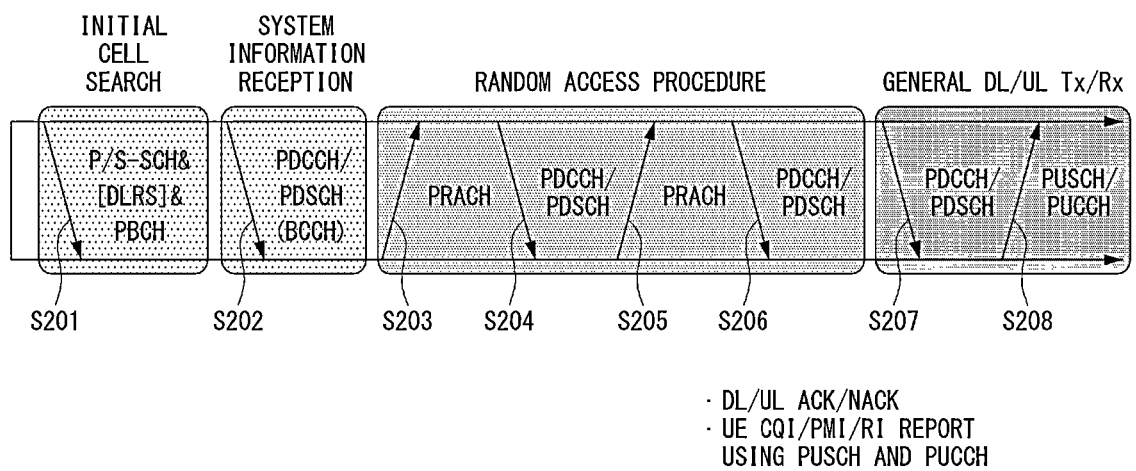

[FIG. 5]
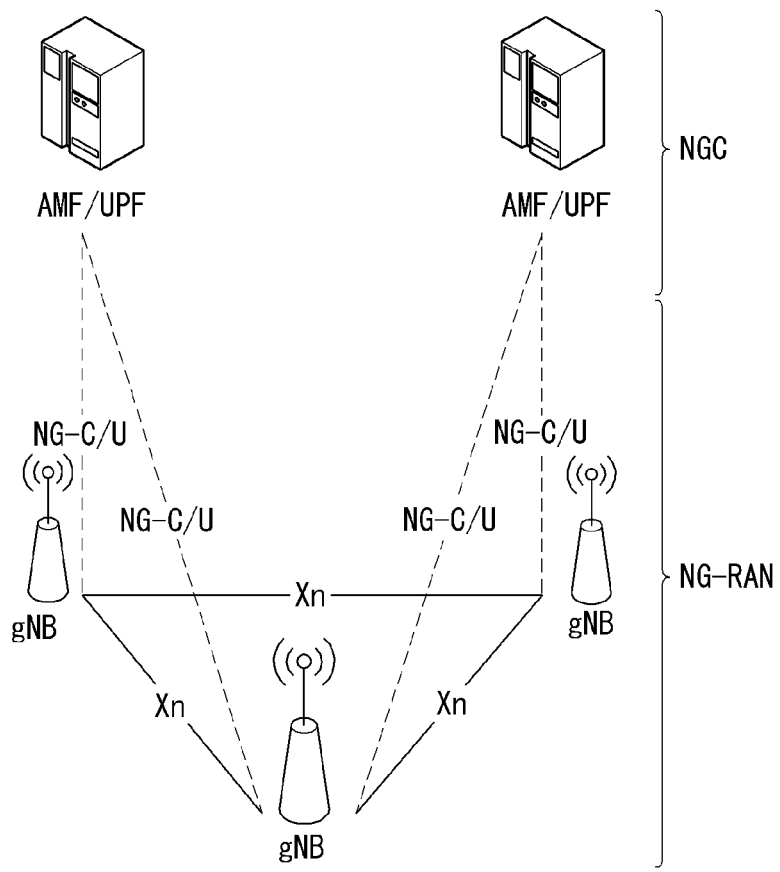
[FIG. 6]
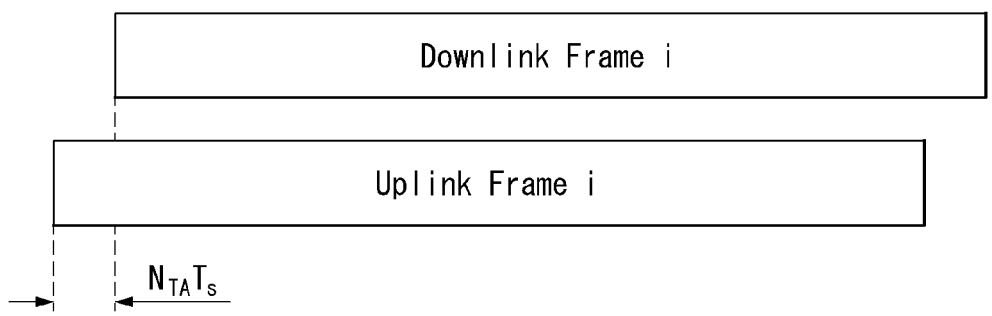

[FIG. 7]
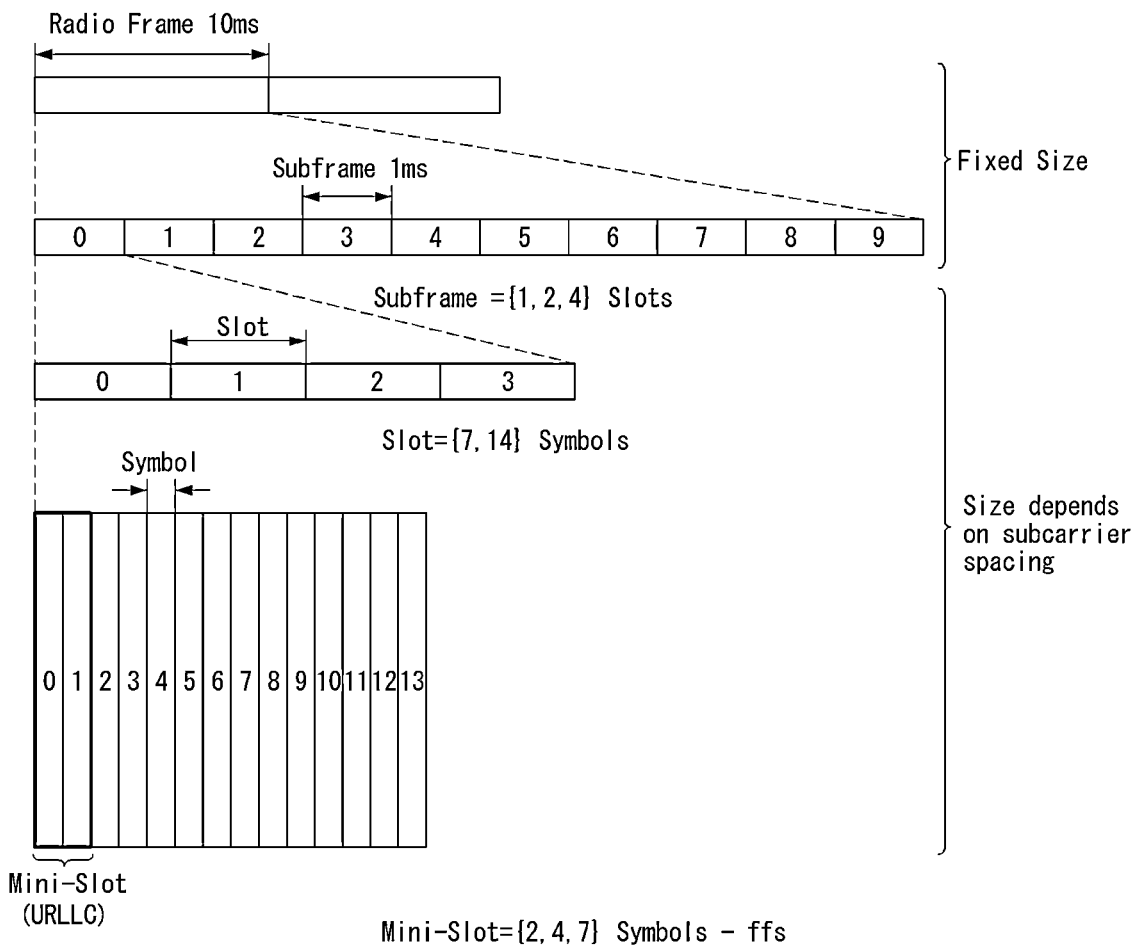

[FIG. 8]
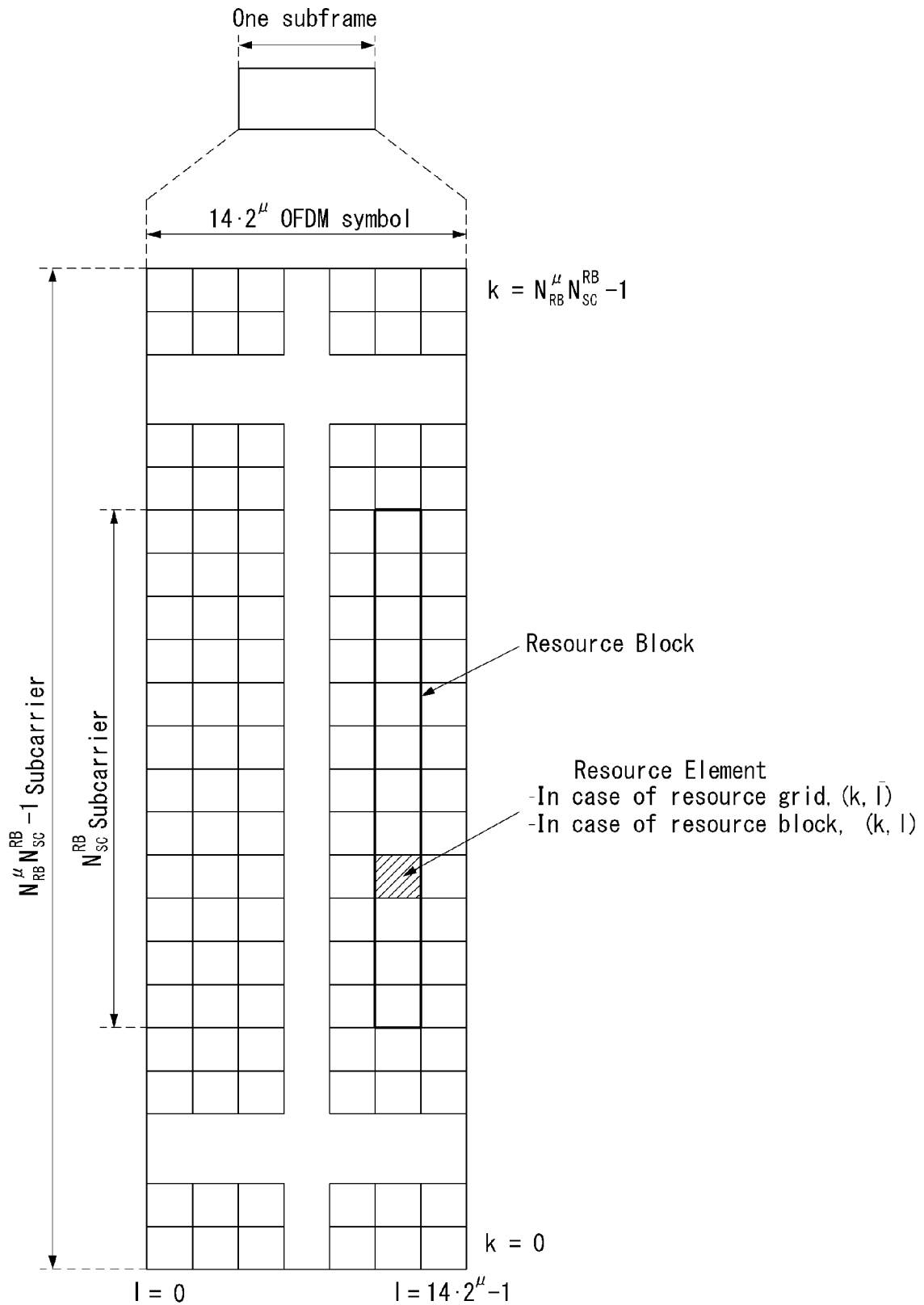

[FIG. 9]
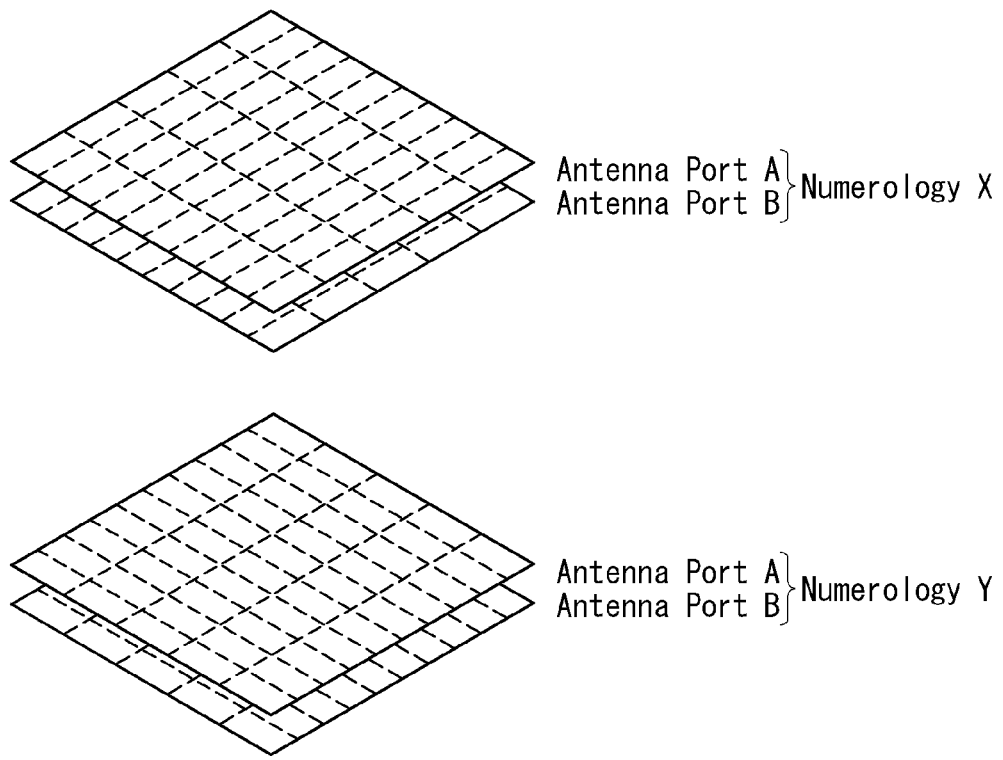
[FIG. 10]
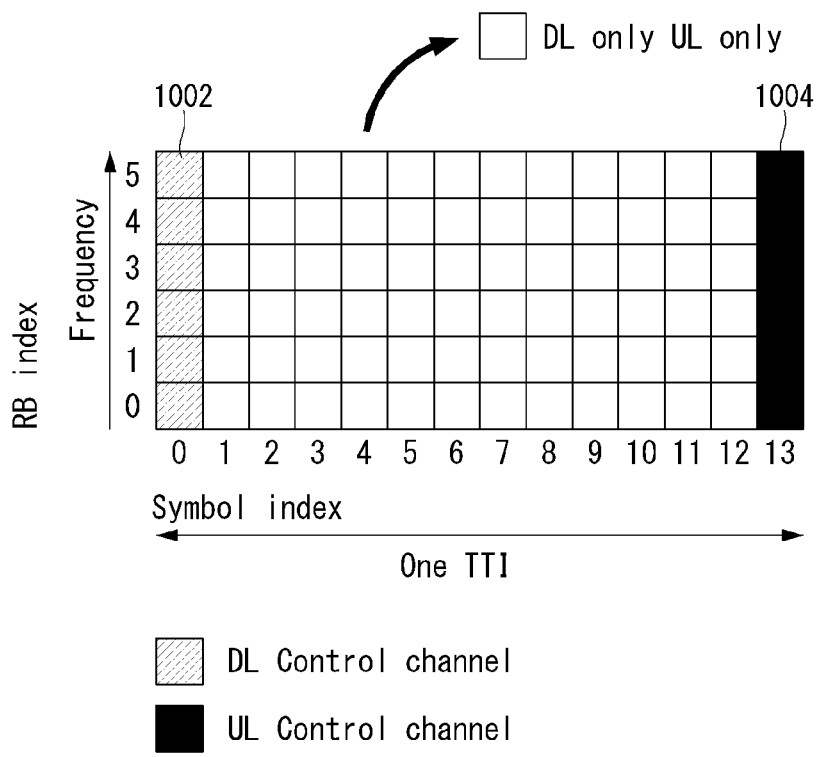

[FIG. 11]
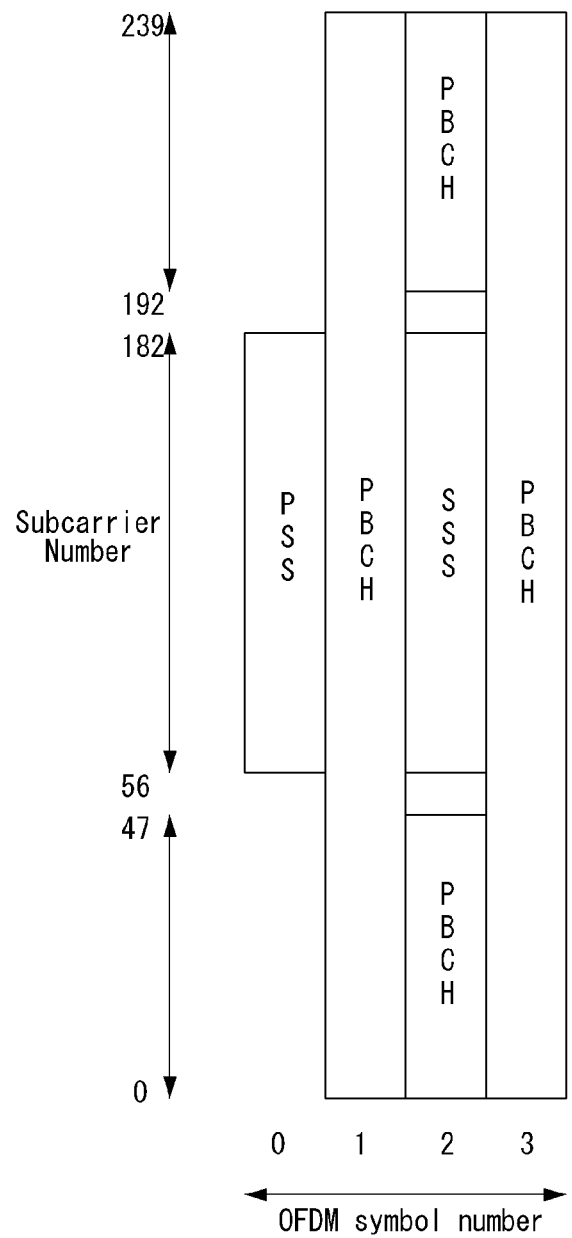

[FIG. 12]
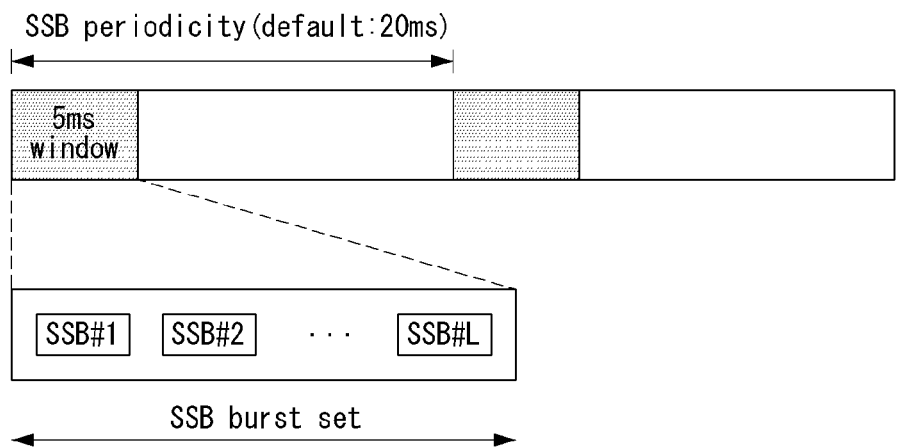
[FIG. 13]
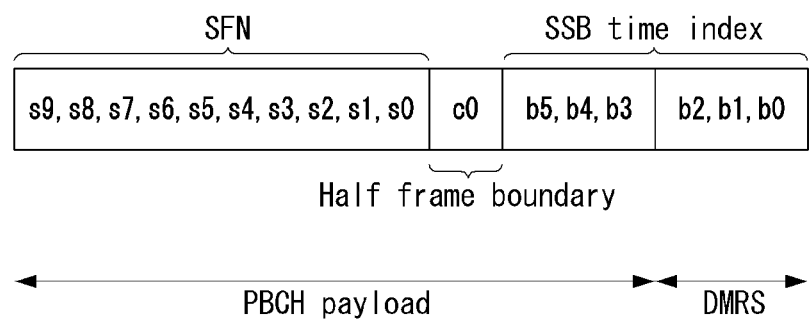

【FIG. 14】
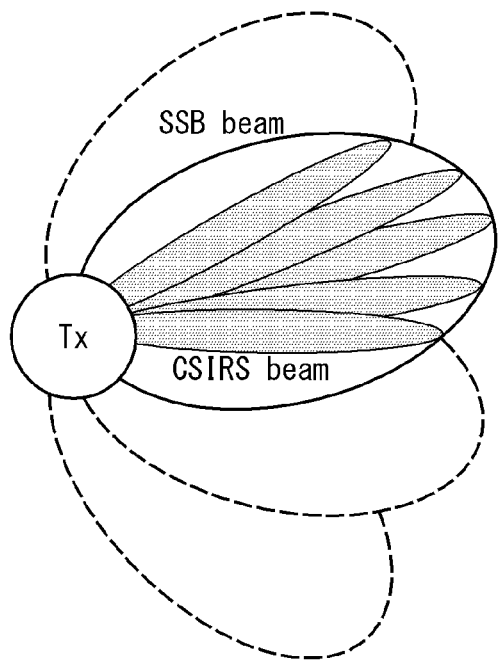
【FIG. 15】
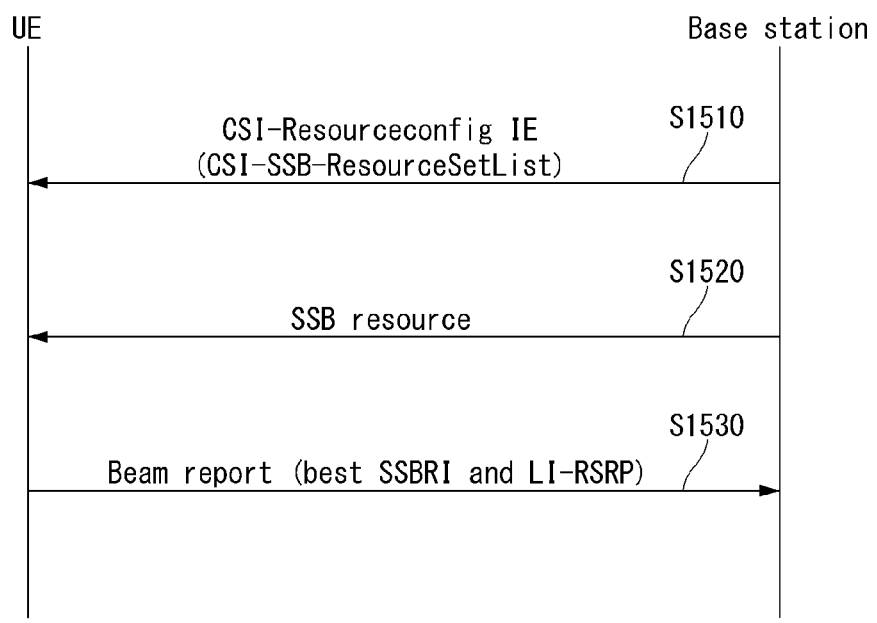

[FIG. 16]
(a)
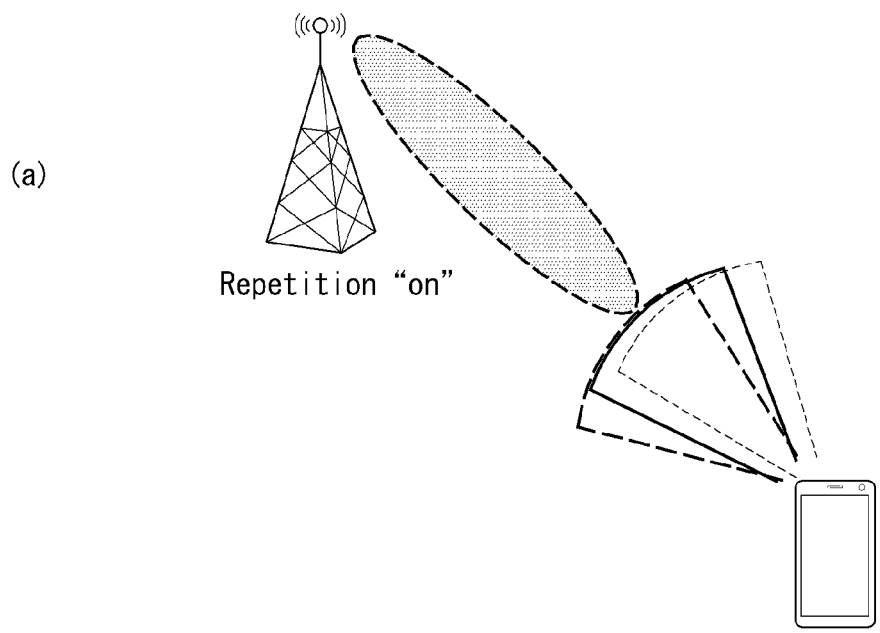
Repetition "on"
(b)
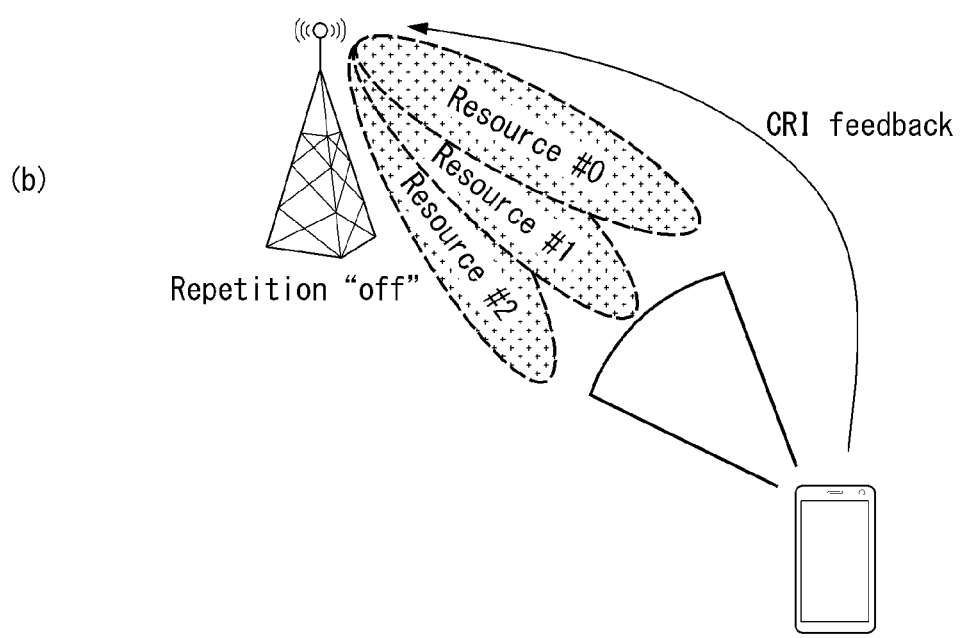
Repetition "off"

[FIG. 17]
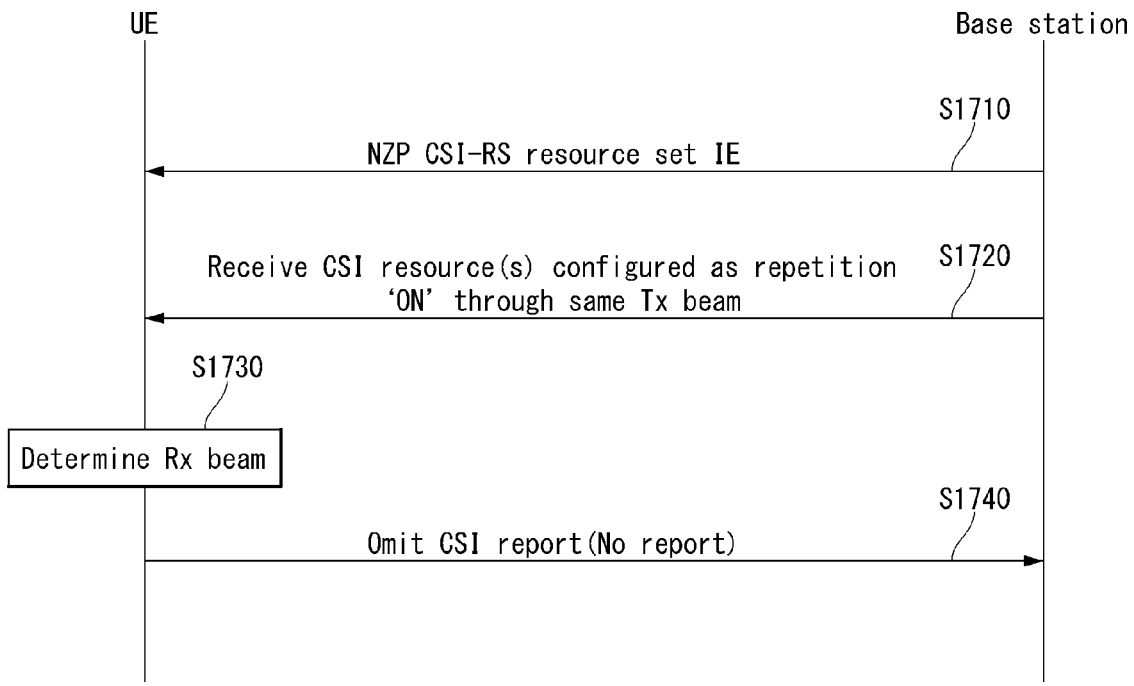
[FIG. 18]
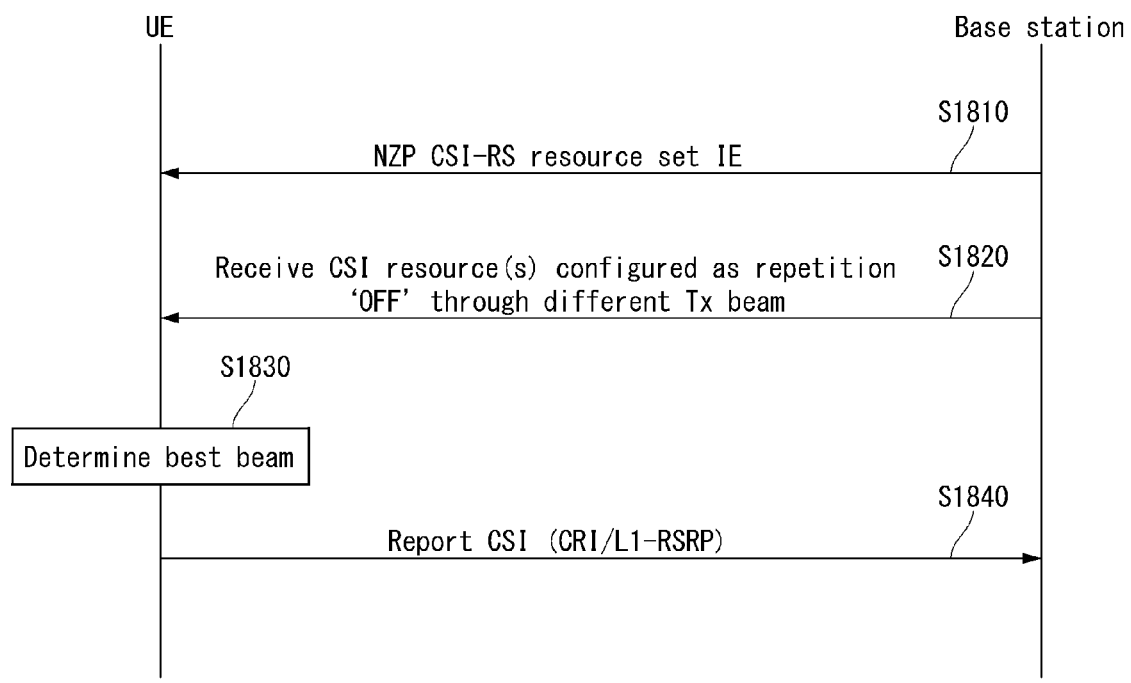

[FIG. 19]
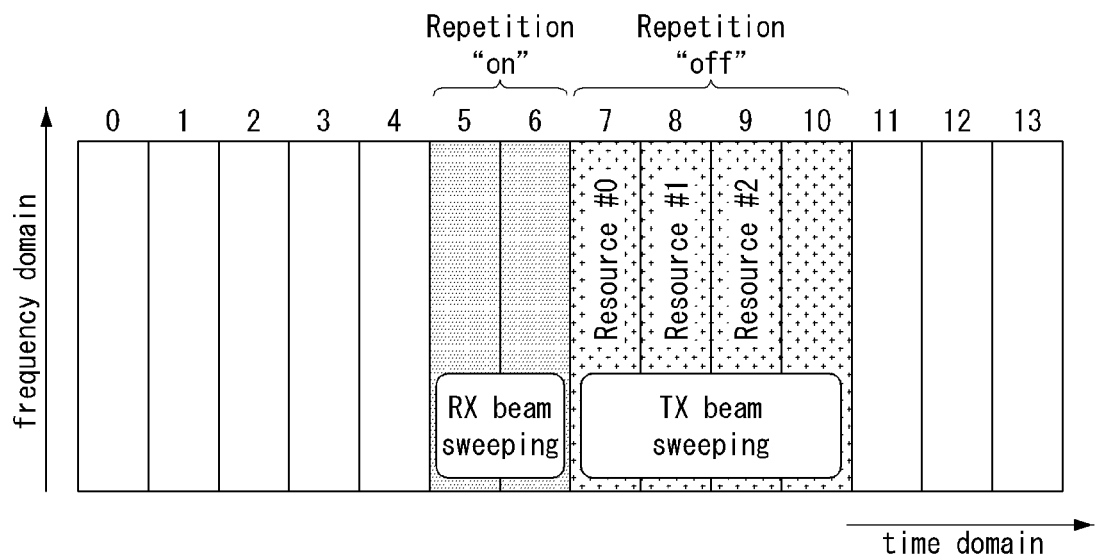
[FIG. 20]
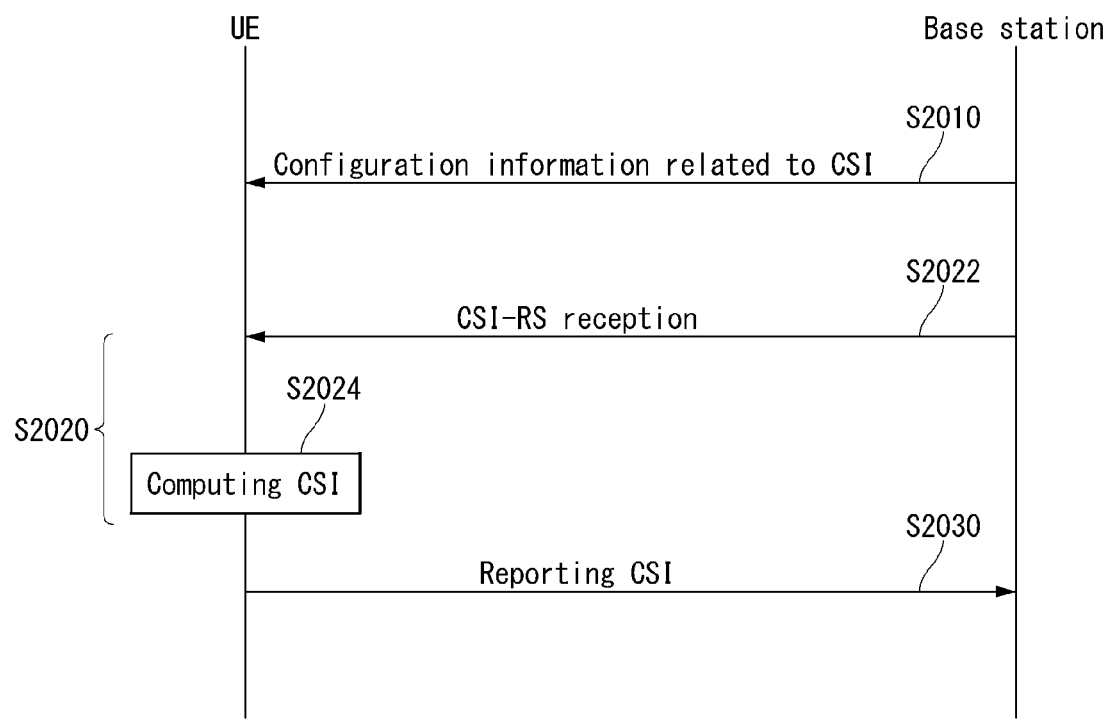

[FIG. 21]
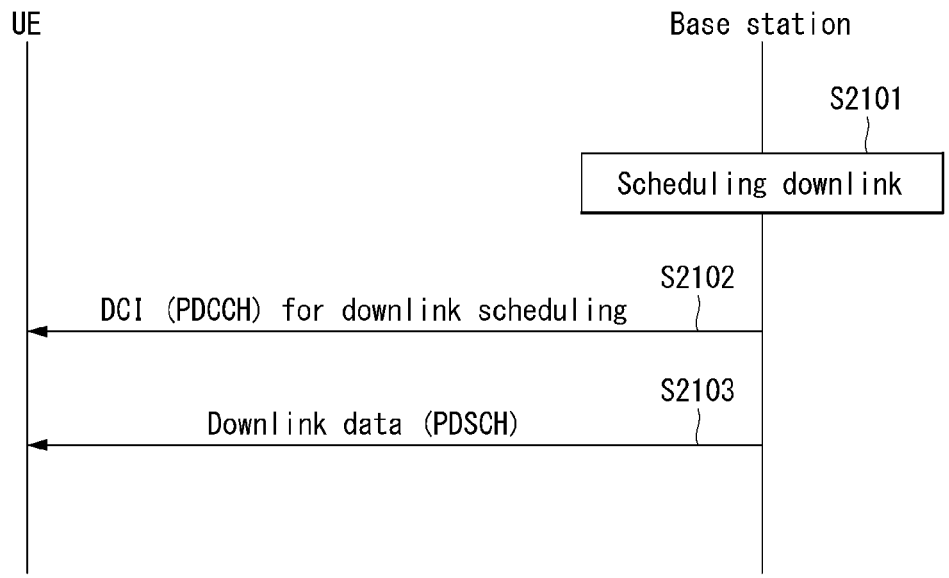
[FIG. 22]
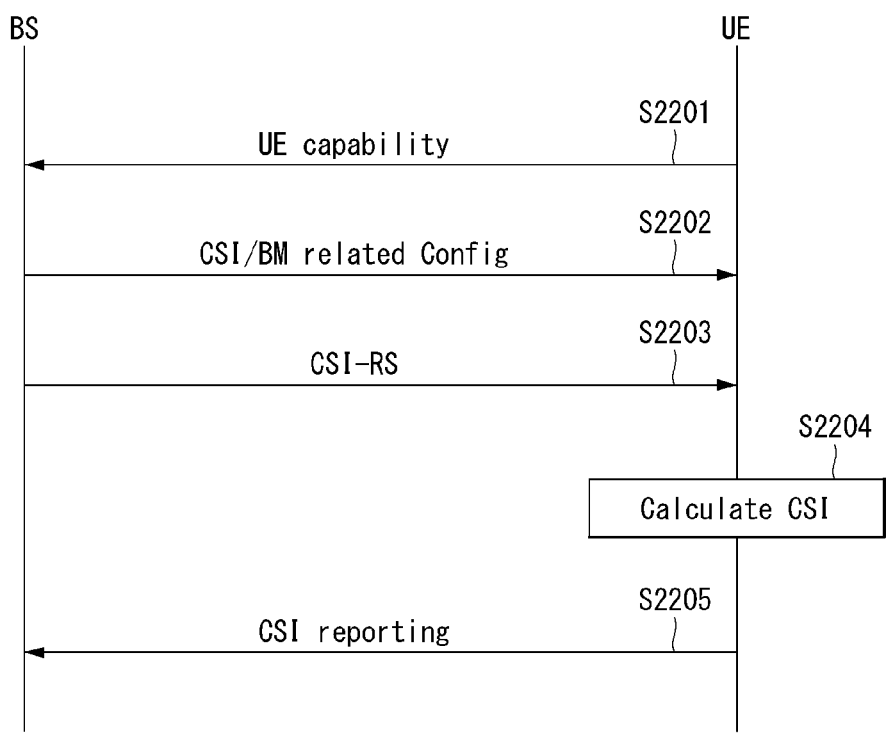

[FIG. 23]
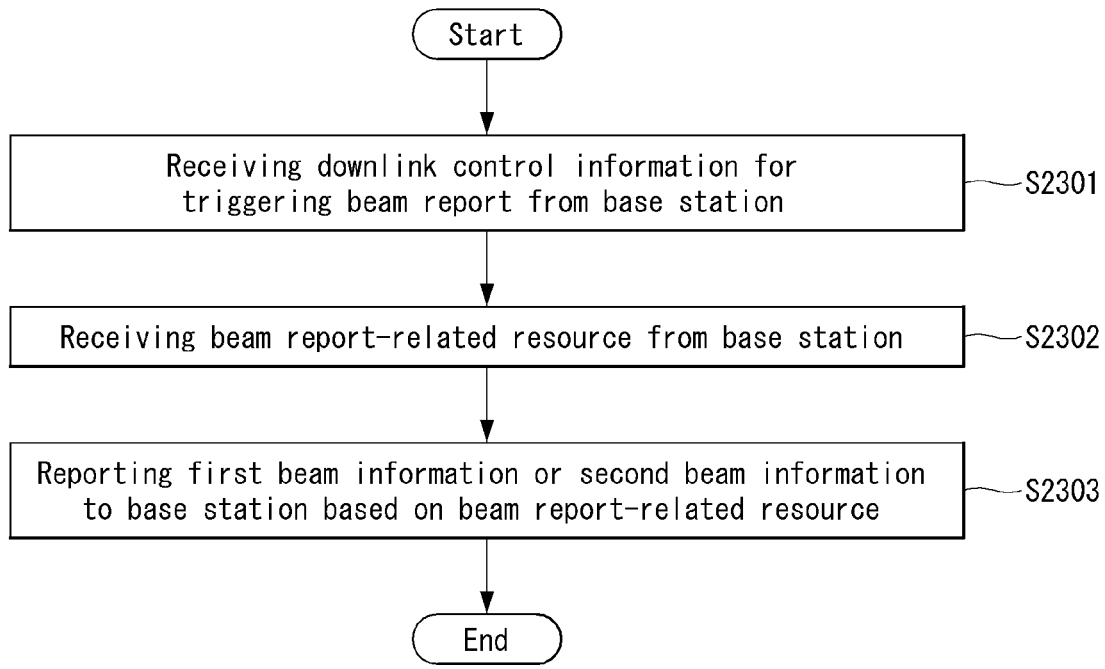
[FIG. 24]
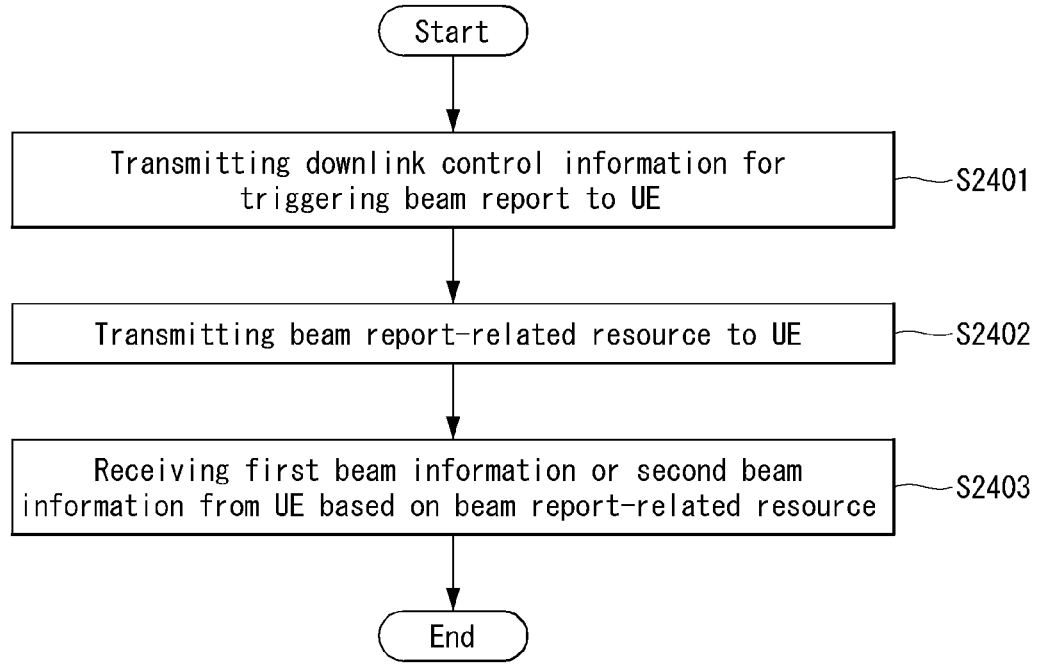

【FIG. 25】
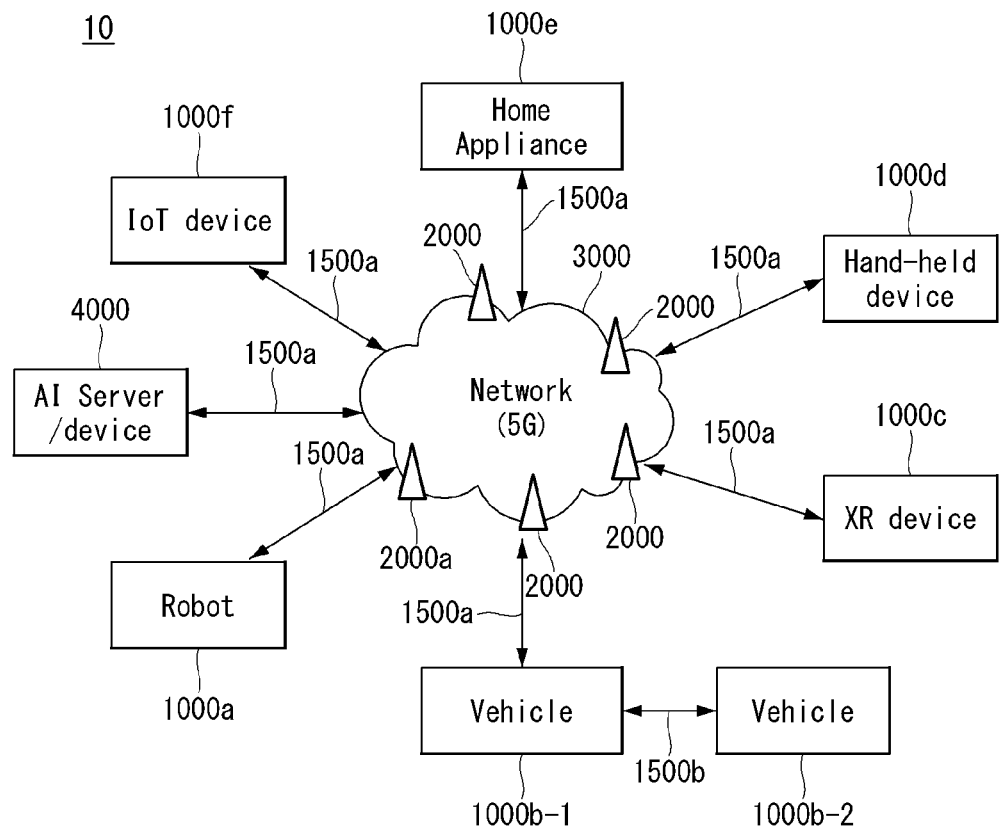
【FIG. 26】
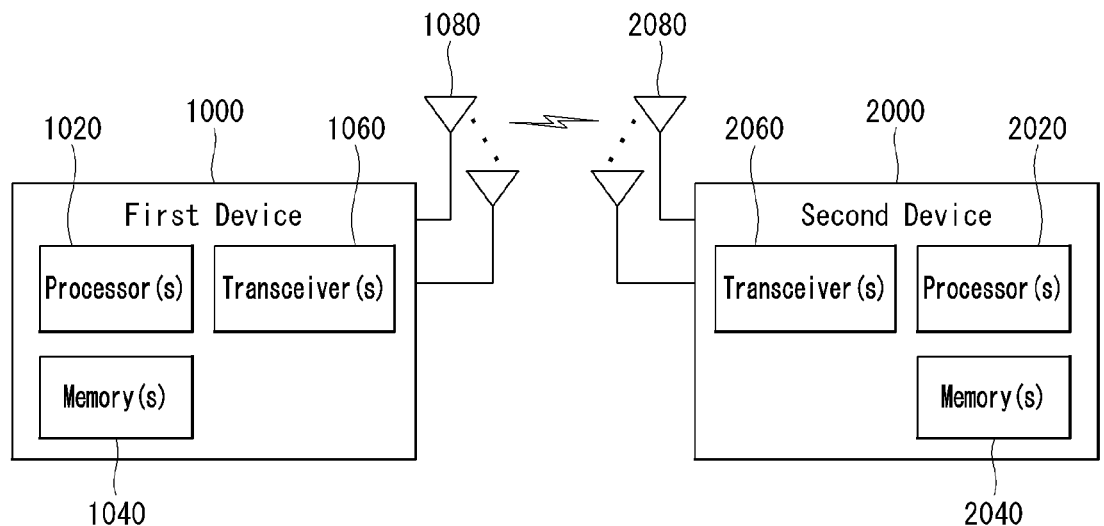

[FIG. 27]
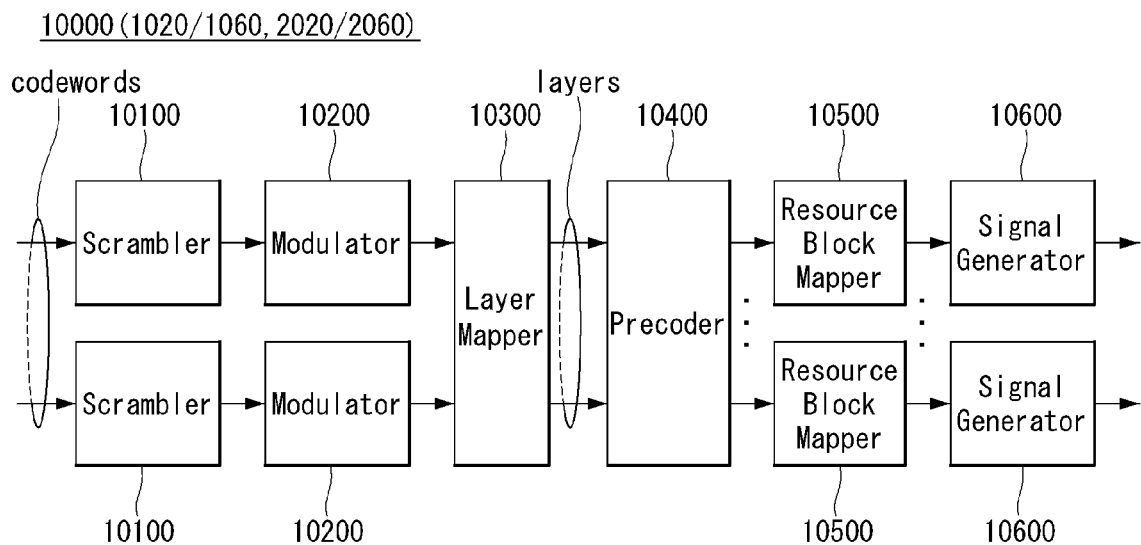
[FIG. 28]
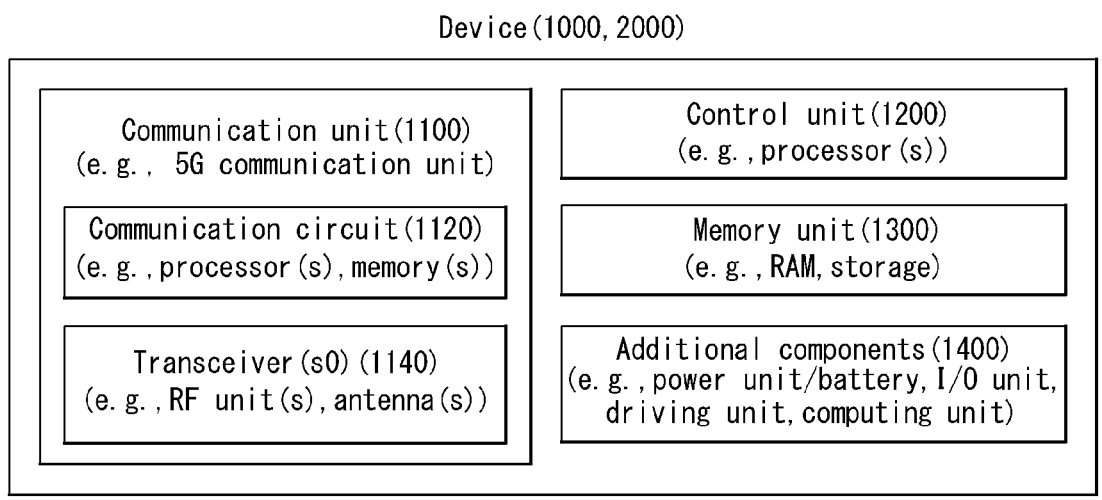

[FIG. 29]
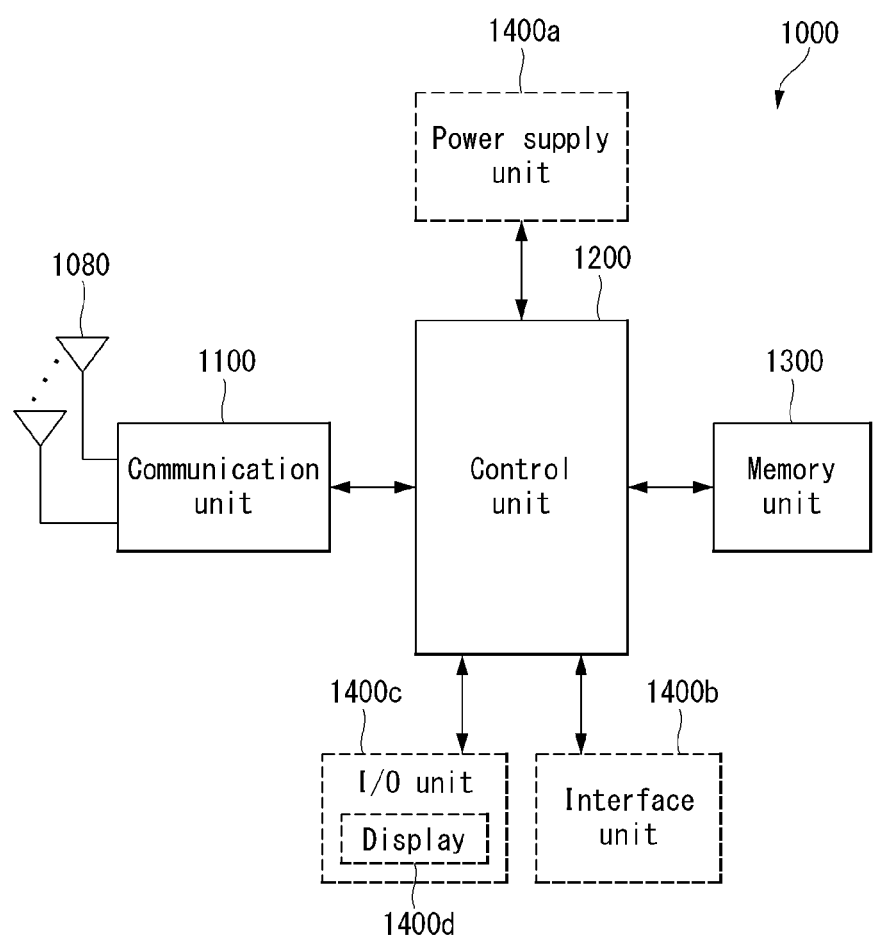

METHOD FOR REPORTING BEAM INFORMATION IN WIRELESS COMMUNICATION SYSTEM, AND APPARATUS THEREFOR

This application is the National Stage filing under 35 U.S.C. 371 of International Application No. PCT/KR2020/006313, filed on May 14, 2020, which claims the benefit of and priority to U.S. Provisional Application No. 62/849,128, filed on May 16, 2019, the contents of which are all hereby incorporated by reference herein in their entirety.

TECHNICAL FIELD

The present disclosure relates to a wireless communication system, and more specifically, to a method for reporting beam information and a device supporting the same.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method and a device for defining/configurating a minimum required time (e.g. Z/Z') applied for reporting received power information (e.g. RSRP(s)) and noise and interference information (e.g. L1-SINR(s)).

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

Technical Solution

The present disclosure proposes a method of reporting beam information in a wireless communication system. The method performed by a user equipment (UE) comprises receiving downlink control information for triggering a beam report from a base station, receiving a beam report-related resource from the base station, and reporting first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

In addition, in the method of the present disclosure, the first minimum required time may have a value greater than or equal to the second minimum required time.

In addition, in the method of the present disclosure, the first minimum required time may be a value obtained by adding 1 symbol to the second minimum required time.

In addition, in the method of the present disclosure, the received power information may include reference signal received power (RSRP), and the noise and interference information may include a signal to interference noise ratio (SINR).

In addition, in the method of the present disclosure, the beam report-related resource may be a channel state information-reference signal (CSI-RS) resource or a synchronization signal block (SSB) resource.

In addition, in the method of the present disclosure, the beam report may be an aperiodic beam report.

In addition, a user equipment (UE) reporting beam information in a wireless communication system in the present disclosure, the UE comprises one or more transceivers, one or more processors functionally connected to the one or more transceivers, and one or more memories functionally connected to the one or more processors and storing instructions for performing operations, wherein the operations includes receiving downlink control information for triggering a beam report from a base station, receiving a beam report-related resource from the base station, and reporting first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

In addition, in the UE of the present disclosure, the first minimum required time may have a value greater than or equal to the second minimum required time.

In addition, in the UE of the present disclosure, the first minimum required time may be a value obtained by adding 1 symbol to the second minimum required time.

In addition, in the UE of the present disclosure, the received power information may include reference signal received power (RSRP), and the noise and interference information may include a signal to interference noise ratio (SINR).

In addition, in the UE of the present disclosure, the beam report-related resource may be a channel state information-reference signal (CSI-RS) resource or a synchronization signal block (SSB) resource.

In addition, in the UE of the present disclosure, the beam report may be an aperiodic beam report.

In addition, a device comprising one or more memories and one or more processors functionally connected to the one or more memories in the present disclosure, wherein the one or more processors is configured to cause the device to receive downlink control information for triggering a beam report from a base station, receive a beam report-related resource from the base station, and report first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

In addition, a non-transitory computer-readable medium (CRM) storing one or more instructions in the present disclosure, wherein the one or more instructions, which are executable by one or more processors, are configured to cause a user equipment (UE) to receive downlink control information for triggering a beam report from a base station, receive a beam report-related resource from the base station, and report first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

Advantageous Effects

According to the present disclosure, by defining/configurating a minimum required time (e.g. Z/Z') applied for reporting received power information (e.g. RSRP(s)) and noise and interference information (e.g. L1-SINR(s)), there is an effect that reliable beam information can be reported.

In addition, according to the present disclosure, even in the case of measuring an interference measurement resource (IMR), there is an effect of performing reliable beam report.

In addition, according to the present disclosure, there is an effect that can implement a low-latency, high-reliability communication system.

Effects that could be achieved with the present disclosure are not limited to those that have been described hereinabove merely by way of example, and other effects and advantages of the present disclosure will be more clearly understood from the following description by a person skilled in the art to which the present disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram showing an AI device 100 according to an embodiment of the present invention.

FIG. 2 is a diagram showing the AI server 200 according to an embodiment of the present invention.

FIG. 3 is a diagram showing an AI system 1 according to an embodiment of the present invention.

FIG. 4 illustrates physical channels and general signal transmission used in a 3GPP system.

FIG. 5 is a diagram illustrating an example of an overall system structure of NR to which a method proposed in the present disclosure may be applied.

FIG. 6 illustrates a relationship between an uplink frame and a downlink frame in a wireless communication system to which a method proposed in the present disclosure may be applied.

FIG. 7 illustrates an example of a frame structure in an NR system.

FIG. 8 illustrates an example of a resource grid supported in a wireless communication system to which a method described in the present disclosure is applicable.

FIG. 9 illustrates examples of a resource grid per antenna port and numerology to which a method described in the present disclosure is applicable.

FIG. 10 illustrates an example of a self-contained structure to which a method described in the present disclosure is applicable.

FIG. 11 illustrates an SSB architecture.

FIG. 12 illustrates SSB transmission.

FIG. 13 illustrates that a UE acquires information on DL time synchronization.

FIG. 14 illustrates beam measurement with an SB beam and a CSI-RS beam.

FIG. 15 is a flow chart illustrating an example of a DL BM procedure using an SSB.

FIG. 16 illustrates an example of a DL BM procedure using a CSI-RS.

FIG. 17 is a flow chart illustrating an example of a received beam determination process of a UE.

FIG. 18 is a flow chart illustrating an example of a method of determining, by a base station, a transmission beam.

FIG. 19 illustrates an example of resource allocation in time and frequency domains related to the operation of FIG. 16.

FIG. 20 is a flowchart illustrating an example of a CSI-related procedure.

FIG. 21 shows an example of a downlink transmission/reception operation.

FIG. 22 illustrates an example of a signaling procedure related to a method proposed in the present disclosure.

FIG. 23 is a flow chart illustrating an operation method of a UE described in the present disclosure.

FIG. 24 is a flow chart illustrating an operation method of a base station described in the present disclosure.

FIG. 25 illustrates a communication system 10 applied to the present disclosure.

FIG. 26 illustrates a wireless device applicable to the present disclosure.

FIG. 27 illustrates a signal processing circuit for a transmission signal.

FIG. 28 illustrates another example of a wireless device applied to the present disclosure.

FIG. 29 illustrates a portable device applied to the present disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the following, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Embodiments of the present disclosure may be supported by standard documents disclosed in at least one of IEEE 802, 3GPP, and 3GPP2 which are the wireless access systems. That is, steps or parts in the embodiments of the present disclosure which are not described to clearly show the technical spirit of the present disclosure may be supported by the standard documents. Further, all terms described in this document may be described by the standard document.

3GPP LTE/LTE-A/New RAT (NR) is primarily described for clear description, but technical features of the present disclosure are not limited thereto.

Hereinafter, examples of 5G use scenarios to which a method described in the present disclosure is applicable are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described in detail below.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

Automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method described in the present disclosure is applicable.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™ radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

FIG. 2 is a diagram showing the AI server 200 to which a method described in the present disclosure is applicable.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 3 is a diagram showing an AI system 1 to which a method described in the present disclosure is applicable.

Referring to FIG. 3, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100*c* may generate location data and attributes data for three-dimensional points by analyzing three-dimensional point cloud data or image data obtained through various sensors or from an external device, may obtain information for a surrounding space or real object based on the generated location data and attributes data, and may output an XR object by rendering the XR object. For example, the XR device 100*c* may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously run along a given flow without control of a user or that autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through a LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

AI+Robot+XR

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100*a*, that is, a target of control/interaction within an XR image, obtains sensor information from sensors including a camera, the robot 100*a* or the XR device 100*c* may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at timing of the robot 100*a*, remotely operating in conjunction through an external device, such as the XR device 100*c*, may adjust the self-driving path of the robot 100*a* through an interaction, may control an operation or driving, or may identify information of a surrounding object.

AI+Self-Driving+XR

An AI technology and an XR technology are applied to the self-driving vehicle 100*b*, and the self-driving vehicle 100*b* may be implemented as a movable type robot, a vehicle, an unmanned flight body, etc.

The self-driving vehicle 100*b* to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 100*c*, and they may operate in conjunction with each other.

The self-driving vehicle 100*b* equipped with the means for providing an XR image may obtain sensor information from sensors including a camera, and may output an XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Physical Channels and General Signal Transmission

FIG. 4 illustrates physical channels and general signal transmission used in a 3GPP system. in a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S201). To this end, the UE may receive a Primary Synchronization Channel (P-SCH) and a (Secondary Synchronization Channel (S-SCH) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S202).

Meanwhile, when there is no radio resource first accessing the eNB or for signal transmission, the UE may perform a Random Access Procedure (RACH) to the eNB (S203 to S206). To this end, the UE may transmit a specific sequence to a preamble through a Physical Random Access Channel (PRACH) (S203 and S205) and receive a response message (Random Access Response (RAR) message) for the preamble through the PDCCH and a corresponding PDSCH (S204 and S206). In the case of a contention based RACH, a Contention Resolution Procedure may be additionally performed.

The UE that performs the above procedure may then perform PDCCH/PDSCH reception (S207) and Physical Uplink Shared Channel (PUSCH)/Physical Uplink Control Channel (PUCCH) transmission (S208) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. For 3GPP LTE system, The UE may transmit the control information such as the CQI/PMI/RI, etc., through the PUSCH and/or PUCCH.

As smartphones and Internet of Things (IoT) terminals are rapidly spread, the amount of information exchanged through a communication network is increasing. As a result, next-generation wireless access technologies can provide faster service to more users than traditional communication systems (or traditional radio access technologies) (e.g., enhanced mobile broadband communication) Needs to be considered.

To this end, the design of a communication system that considers Machine Type Communication (MTC), which provides services by connecting a number of devices and objects, is being discussed. It is also being discussed as a multiuser of communication systems (e.g., Ultra-Reliable and Low Latency Communication, URLLC) that take into account the reliability and/or latency-sensitive services (service) and/or a user equipment.

Hereinafter, in the present disclosure, for convenience of description, the next generation radio access technology is referred to as NR (New RAT), and the radio communication system to which the NR is applied is referred to as an NR system.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 5 illustrates an example of an overall structure of an NR system to which a method described in the present disclosure is applicable.

Referring to FIG. 5, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 2.

TABLE 2

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 6 illustrates the relation between an uplink frame and a downlink frame in a wireless communication system to which a method described in the present disclosure is applicable.

As illustrated in FIG. 6, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{frame}^{slots,\mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 7 illustrates an example of a frame structure in an NR system. FIG. 6 is merely for convenience of explanation and does not limit the scope of the disclosure.

In Table 3, in the case of μ=2, i.e., as an example in which a subcarrier spacing (SCS) is 60 kHz, one subframe (or frame) may include four slots with reference to Table 4, and one subframe={1, 2, 4} slots shown in FIG. 6, for example, the number of slot(s) that may be included in one subframe may be defined as in Table 4.

Further, a mini-slot may consist of 2, 4, or 7 symbols, or may consist of more symbols or less symbols.

In relation to physical resources in the NR system, an antenna port, a resource grid, a resource element, a resource block, a carrier part, etc. may be considered.

Hereinafter, the above physical resources that can be considered in the NR system are described in more detail.

First, in relation to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 8 illustrates an example of a resource grid supported in a wireless communication system to which a method described in the present disclosure is applicable.

Referring to FIG. 8, a resource grid consists of $N_{RB}^\mu N_{sc}^{RB}$ subcarriers on a frequency domain, each subframe consisting of $14 \cdot 2^\mu$ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \le N_{RB}^{max,\mu}$. $N_{RB}^{max,\mu}$ denotes a maximum transmission bandwidth and may change not only between numerologies but also between uplink and downlink.

In this case, as illustrated in FIG. 9, one resource grid may be configured per numerology μ and antenna port p.

FIG. 9 illustrates examples of a resource grid per antenna port and numerology to which a method described in the present disclosure is applicable.

Each element of the resource grid for the numerology μ and the antenna port p is called a resource element and is uniquely identified by an index pair (k,l), where k=0, . . . , $N_{RB}^\mu N_{sc}^{RB}-1$ is an index on a frequency domain, and l=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu - 1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

In this case, k may be defined relative to the point A so that k=0 corresponds to a subcarrier centered around the point A. Physical resource blocks are defined within a bandwidth part (BWP) and are numbered from 0 to $N_{BWPi}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

In this case, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

FIG. 10 illustrates an example of a self-contained structure to which a method described in the present disclosure is applicable. FIG. 10 is merely for convenience of explanation and does not limit the scope of the disclosure.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in the case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In relation to the time gap, if uplink transmission is performed after downlink transmission in the self-contained slot, some OFDM symbol(s) may be configured as a guard period (GP).

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP.

In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Synchronization Signal Block (SSB) Transmission and Related Operation

FIG. 11 illustrates a SSB architecture. The UE may perform cell search, system information acquisition, beam alignment for initial access, DL measurement, etc., based on an SSB. The SSB is mixedly used with an SS/Synchronization Signal/Physical Broadcast channel (PBCH) block.

Referring to FIG. 11, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 5 below.

TABLE 5

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/ Search space configuration |

TABLE 5-continued

| | Type of Signals | Operations |
|---|---|---|
| 5th Step | PDCCH and PDSCH | Cell access information RACH configuration |

There are 336 cell ID groups, and there are 3 cell IDs for each cell ID group. There are a total of 1008 cell IDs, and the cell IDs may be defined by Equation 3.

$$N_{ID}^{cell}=3N_{ID}^{(1)}+N_{ID}^{(2)} \quad \text{[Equation 3]}$$

where, $N_{ID}^{(1)} \in \{0, 1, \ldots, 335\}$ and $N_{ID}^{(2)} \in \{0, 1, 2\}$.

Here, NcellID represents a cell ID (e.g. PCID). N(1)ID represents a cell ID group and is provided/obtained through SSS. N(2)ID represents a cell ID within a cell ID group and is provided/obtained through PSS.

The PSS sequence dPSS(n) may be defined to satisfy Equation 4.

$$d_{PSS}(n)=1-2x(m)$$

$$m=(n+43N_{ID}^{(2)}) \bmod 127$$

$$0 \leq n < 127 \quad \text{[Equation 4]}$$

where, $x(i+7)=(x(i+4)+x(i)) \bmod 2$ and,
$[x(6)\ x(5)\ x(4)\ x(3)\ x(2)\ x(1)\ x(0)]=[1\ 1\ 1\ 0\ 1\ 1\ 0]$.

The SSS sequence dSSS(n) may be defined to satisfy Equation 5.

$$d_{SSS}(n) = [1 - 2x_0((n + m_0) \bmod 127)] \quad \text{[Equation 5]}$$

$$[1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \leq n < 127$$

$$x_0(i+7) = (x_0(i+4) + x_0(i)) \bmod 2 \text{ where,}$$

$$x_1(i+7) = (x_1(i+1) + x_1(i)) \bmod 2, \text{ and}$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1].$$

FIG. 12 illustrates SSB transmission.

Referring to FIG. 12, the SSB is periodically transmitted according to an SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

The temporal position of the SSB candidate in the SS burst set may be defined as follows according to the SCS. The temporal positions of SSB candidates are indexed from 0 to L−1 (SSB index) according to temporal order within the SSB burst set (i.e. half-frame).

Case A—15 kHz SCS: The index of the start symbol of the candidate SSB is given as {2, 8}+14*n. If the carrier frequency is 3 GHz or less, n=0, 1. If the carrier frequency is 3 GHz to 6 GHz, n=0, 1, 2, 3.

Case B—30 kHz SCS: The index of the start symbol of the candidate SSB is given as {4, 8, 16, 20}+28*n. If the carrier frequency is 3 GHz or less, n=0. If the carrier frequency is 3 GHz to 6 GHz, n=0, 1.

Case C—30 kHz SCS: The index of the start symbol of the candidate SSB is given as {2, 8}+14*n. If the carrier frequency is 3 GHz or less, n=0, 1. If the carrier frequency is 3 GHz to 6 GHz, n=0, 1, 2, 3.

Case D—120 kHz SCS: The index of the start symbol of the candidate SSB is given as {4, 8, 16, 20}+28*n. If the carrier frequencies is greater than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. If the carrier frequencies is greater than 6 GHz, n=0, 1, 2, 3, 5, 6, 7, 8.

FIG. 13 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences (b0 to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 1 bit which remain after indicating the SSB index among 3 bits which may be indicated by using eight PBCH DRMS sequences may be used for the half frame indication (b2).

Beam Management (BM) Procedure

A beam management (BM) procedure defined in new radio (NR) is described below.

The BM procedure corresponds to layer 1 (L1)/L2 (layer 2) procedures for obtaining and maintaining a set of base station (e.g., gNB or TRP) and/or a terminal (e.g., UE) beams which may be used for downlink (DL) and uplink (UL) transmission/reception, and may include the following procedure and terms.

Beam measurement: an operation of measuring characteristics of a beamforming signal received by a base station or a UE.

Beam determination: an operation of selecting, by a base station or a UE, its own transmission (Tx) beam/reception (Rx) beam.

Beam sweeping: an operation of covering a space region by using a transmission beam and/or a reception beam for a given time interval in a predetermined manner.

Beam report: an operation of reporting, by a UE, information of a beamformed signal based on beam measurement.

the BM procedure may be divided into (1) a DL BM procedure using a synchronization signal (SS)/physical broadcast channel (PBCH) Block or CSI-RS and (2) an UL BM procedure using a sounding reference signal (SRS).

Furthermore, each of the BM procedures may include Tx beam sweeping for determining a Tx beam and Rx beam sweeping for determining an Rx beam.

DL BM

The DL BM procedure may include (1) the transmission of beamformed DL reference signals (RSs) (e.g., CSI-RS or SS block (SSB)) of a base station and (2) beam reporting of a UE.

In this case, the beam reporting may include a preferred DL RS identifier (ID)(s) and L1-reference signal received power (RSRP) corresponding thereto.

The DL RS ID may be an SSB resource indicator (SSBRI) or a CSI-RS resource indicator (CRI).

As illustrated in FIG. 14, an SSB beam and a CSI-RS beam may be used for beam measurement. In this case, a measurement metric is L1-RSRP for each resource/block. An SSB may be used for coarse beam measurement, and a CSI-RS may be used for fine beam measurement. the SSB may be used for both Tx beam sweeping and Rx beam sweeping.

A UE may perform the Rx beam sweeping using an SSB while changing an Rx beam with respect to the same SSBRI across multiple SSB bursts. In this case, one SS burst includes one or more SSBs, and one SS burst set includes one or more SSB bursts.

DL BM Using SSB

FIG. 15 is a flow chart illustrating an example of a DL BM procedure using an SSB.

A configuration for a beam report using an SSB is performed upon CSI/beam configuration in an RRC connected state (or RRC connected mode).

The user equipment (UE) receives a CSI-ResourceConfig IE including a CSI-SSB-ResourceSetList including SSB resources used for BM from the base station (S1510).

Table 6 shows an example of the CSI-ResourceConfig IE, as shown in Table 6, a BM configuration using an SSB is not separately defined, and an SSB is configured like a CSI-RS resource.

TABLE 6

```
-- ASN1START
-- TAG-CSI-RESOURCECONFIG-START
CSI-ResourceConfig ::=            SEQUENCE {
    csi-ResourceConfigId            CSI-ResourceConfigId,
    csi-RS-ResourceSetList          CHOICE {
      nzp-CSI-RS-SSB                  SEQUENCE {
        nzp-CSI-RS-ResourceSetList      SEQUENCE (SIZE
(1..maxNrofNZP-CSI-RS-ResourceSetsPerConfig)) OF NZP-CSI-RS-ResourceSetId
OPTIONAL,
        csi-SSB-ResourceSetList          SEQUENCE (SIZE (1..maxNrofCSI-
SSB-ResourceSetsPerConfig)) OF CSI-SSB-ResourceSetIdOPTIONAL
      },
      csi-IM-ResourceSetList          SEQUENCE (SIZE (1..maxNrofCSI-IM-
ResourceSetsPerConfig)) OF CSI-IM-ResourceSetId
    },
    bwp-Id                          BWP-Id,
    resourceType                    ENUMERATED { aperiodic, semiPersistent,
periodic },
    ...
}
-- TAG-CSI-RESOURCECONFIGTOADDMOD-STOP
-- ASN1STOP
```

In Table 6, the csi-SSB-ResourceSetList parameter indicates a list of SSB resources used for beam management and reporting in one resource set. Here, the SSB resource set may be configured as {SSBx1, SSBx2, SSBx3, SSBx4, . . . }. The SSB index may be defined from 0 to 63. the UE receives an SSB resource from the base station based on the CSI-SSB-ResourceSetList (S1520).

Furthermore, if CSI-RS reportConfig related to a report for an SSBRI and L1-RSRP has been configured, the UE (beam) reports, to the base station, the best SSBRI and L1-RSRP corresponding thereto (S1530).

That is, if reportQuantity of the CSI-RS reportConfig IE is configured as "ssb-Index-RSRP", the UE reports the best SSBRI and the L1-RSRP corresponding thereto to the base station.

Furthermore, if a CSI-RS resource is configured in OFDM symbol(s) identical with an SS/PBCH block (SSB) and 'QCL-TypeD' is applicable, the UE may assume that a CSI-RS and an SSB are quasi co-located from a 'QCL-TypeD' perspective.

In this case, the QCL TypeD may mean that antenna ports have been QCLed from a spatial Rx parameter viewpoint. When the UE receives a plurality of DL antenna ports having a QCL Type D relation, the same Rx beam may be applied. Furthermore, the UE does not expect that a CSI-RS will be configured in an RE that overlaps an RE of an SSB.

DL BM Using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resourcesForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols. Further, the UE does not expect that different periodicities are received at periodicityAndOffset in all CSI-RS resources in NZP-CSI-RS-Resourceset.

On the contrary, when Repetition is configured to 'OFF', the Repetition is associated with the Tx beam sweeping procedure of the eNB. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

FIG. 16 illustrates an example of a downlink beam management procedure using a Channel State Information-Reference Signal (CSI-RS). (a) of FIG. 16 illustrates an Rx beam determination (or refinement) procedure of the UE and (b) of FIG. 16 illustrates a Tx beam sweeping procedure of the eNB. Further, (a) of FIG. 16 illustrates a case where the repetition parameter is configured to 'ON' and (b) of FIG. 16 illustrates a case where the repetition parameter is configured to 'OFF'.

Referring to (a) of FIG. 16 and FIG. 17, an Rx beam determination process of the UE will be described.

FIG. 17 is a flowchart showing an example of a receive beam determination process of a UE.

The UE receives, from the eNB, NZP CSI-RS resource set IE including higher layer parameter repetition through RRC signaling (S1710). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1720).

The UE determines the Rx beam thereof (S1730).

The UE skips CSI report (S1740). In this case, reportQuantity of CSI report config may be configured as 'No report (or None)'.

In other words, the UE may skip the CSI report when repetition 'ON' is configured.

Referring to (b) of FIG. 16 and FIG. 18, Tx beam determination process of the eNB will be described.

FIG. 18 is a flowchart showing an example of a transmit beam determination process of an eNB.

The UE receives, from the eNB, NZP CSI-RS resource set IE including higher layer parameter repetition through RRC signaling (S1810). Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1820).

The UE selects (or determines) a best beam (S1830).

The UE reports to the eNB an ID for the selected beam and related quality information (e.g., L1-RSRP) (S1440). In this case, reportQuantity of CSI report config may be configured as 'CRI+L1-RSRP'.

In other words, when the CSI-RS is transmitted for the BM, the UE reports to the eNB the CRI and L1-RSRP therefor.

FIG. 19 illustrates an example of resource allocation in time and frequency domains associated with FIG. 16's operation.

In other words, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM-Related Beam Indication

A UE may be RRC-configured with a list of up to M candidate transmission configuration indication (TCI) states for the purpose of at least quasi co-location (QCL) indication, where M may be 64.

Each of the TCI states may be configured as one RS set. Each ID of a DL RS for at least a spatial QCL purpose (QCL Type D) within the RS set may refer to one of DL RS types, such as an SSB, a P-CSI RS, an SP-CSI RS, and an A-CSI RS.

The initialization/update of an ID of a DL RS(s) within the RS set used for the at least spatial QCL purpose may be performed through at least explicit signaling.

Table 7 illustrates an example of a TCI-State IE.

The TCI-State IE associates one or two DL reference signals (RS) with a corresponding quasi co-location (QCL) type.

TABLE 7

```
-- ASN1START
-- TAG-TCI-STATE-START
TCI-State ::=       SEQUENCE {
   tci-StateId      TCI-StateId,
   qcl-Type1        QCL-Info,
   qcl-Type2        QCL-Info
        OPTIONAL,  -- Need R
   ...
}
```

TABLE 7-continued

```
QCL-Info ::=        SEQUENCE {
   cell             ServCellIndex
       OPTIONAL,   -- Need R
   bwp-Id           BWP-Id
       OPTIONAL,   -- Cond CSI-RS-Indicated
   referenceSignal  CHOICE {
      csi-rs        NZP-CSI-RS-ResourceId,
      ssb           SSB-Index
   },
   qcl-Type         ENUMERATED {typeA, typeB, typeC, typeD},
   ...
}
-- TAG-TCI-STATE-STOP
-- ASN1STOP
```

In Table 7, the bwp-Id parameter indicates a DL BWP where an RS is located. The cell parameter indicates a carrier where an RS is located. The reference signal parameter indicates a reference antenna port(s) that becomes the source of a quasi co-location for a corresponding target antenna port(s) or a reference signal including the reference antenna port(s). A target antenna port(s) may be a CSI-RS, a PDCCH DMRS, or a PDSCH DMRS. For example, in order to indicate QCL reference RS information for an NZP CSI-RS, a corresponding TCI state ID may be indicated in NZP CSI-RS resource configuration information. Furthermore, for example, in order to indicate QCL reference information for a PDCCH DMRS antenna port(s), a TCI state ID may be indicated in a CORESET configuration. Furthermore, for example, in order to indicate QCL reference information for a PDSCH DMRS antenna port(s), a TCI state ID may be indicated via DCI.

Quasi-Co Location (QCL)

An antenna port is defined so that a channel on which a symbol on an antenna port is carried is inferred from a channel on which another symbol on the same antenna port is carried. If the properties of a channel on which a symbol on one antenna port is carried can be derived from a channel on which a symbol on another antenna port is carried, the two antenna ports may be said to have a quasi co-located or quasi co-location (QC/QCL) relation.

In this case, the properties of the channel includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

In order to decode a PDSCH according to a detected PDCCH having intended DCI with respect to a corresponding UE and a given serving cell, a UE may be configured with a list of up to M TCI-State configurations within higher layer parameter PDSCH-Config. The M depends on a UE capability.

Each of the TCI-States includes a parameter for configuring a quasi co-location relation between one or two DL reference signals and the DM-RS port of a PDSCH.

The quasi co-location relation is configured as a higher layer parameter qcl-Type1 for a first DL RS and a higher layer parameter qcl-Type2 (if configured) for a second DL RS. In the case of the two DL RSs, QCL types are not the same regardless of whether reference is the same DL RS or different DL RSs.

A quasi co-location type corresponding to each DL RS is given by a higher layer parameter qcl-Type of QCL-Info, and may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}
'QCL-TypeD': {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and with a specific SSB from a QCL-Type D viewpoint. A UE configured with such an indication/configuration may receive a corresponding NZP CSI-RS by using Doppler, delay value measured in a QCL-TypeA TRS, and may apply, to the reception of the corresponding NZP CSI-RS, an Rx beam used for the reception of a QCL-TypeD SSB.

The UE receives an activation command by MAC CE signaling used to map up to eight TCI states to the codepoint of a DCI field "Transmission Configuration Indication."

Channel State Information Related Procedure

In a New Radio (NR) system, a channel state information-reference signal (CSI-RS) is used for time and/or frequency tracking, CSI computation, layer 1 (L1)-reference signal received power (RSRP) computation, and mobility. Here, The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

FIG. 20 is a flowchart illustrating an example of a CSI-related procedure.

In order to perform one of usages of the CSI-RS, a terminal (e.g., user equipment (UE)) receives, from a base station (e.g., general Node B or gNB), configuration information related to the CSI through radio resource control (RRC) signaling (S2010).

The configuration information related to the CSI may include at least one of CSI-interference management (IM) resource related information, CSI measurement configuration related information, CSI resource configuration related information, CSI-RS resource related information, or CSI report configuration related information.

i) The CSI-IM resource related information may include CSI-IM resource information, CSI-IM resource set information, and the like. The CSI-IM resource set is identified by a CSI-IM resource set identifier (ID) and one resource set includes at least one CSI-IM resource. Each CSI-IM resource is identified by a CSI-IM resource ID.

ii) The CSI resource configuration-related information may be expressed as CSI-ResourceConfig IE. The CSI resource configuration-related information defines a group including at least one of a non zero power (NZP) CSI-RS resource set, a CSI-IM resource set, or a CSI-SSB resource set. That is, the CSI resource configuration-related information may include a CSI-RS resource set list and the CSI-RS resource set list may include at least one of a NZP CSI-RS resource set list, a CSI-IM resource set list, or a CSI-SSB resource set list. The CSI-RS resource set is identified by a CSI-RS resource set ID and one resource set includes at least one CSI-RS resource. Each CSI-RS resource is identified by a CSI-RS resource ID.

As shown in Table 8, parameters (e.g. a BM-related 'repetition' parameter and a tracking-related 'trs-Info' parameter) representing the usage of the CSI-RS may be configured for each NZP CSI-RS resource set.

Table 8 shows an example of the NZP CSI-RS resource set IE.

TABLE 8

```
-- ASN1START
-- TAG-NZP-CSI-RS-RESOURCESET-START
NZP-CSI-RS-ResourceSet ::=      SEQUENCE {
    nzp-CSI-ResourceSetId           NZP-CSI-RS-ResourceSetId,
    nzp-CSI-RS-Resources            SEQUENCE (SIZE (1..maxNrofNZP-CSI-RS-
ResourcesPerSet)) OF NZP-CSI-RS-ResourceId,
    repetition                      ENUMERATED { on, off }
                                    OPTIONAL,
    aperiodicTriggeringOffset       INTEGER(0..4)
                                    OPTIONAL,   -- Need S
    trs-Info                        ENUMERATED {true}
                                    OPTIONAL,   -- Need R
    ...
}
-- TAG-NZP-CSI-RS-RESOURCESET-STOP
-- ASN1STOP
```

In addition, the repetition parameter corresponding to the higher layer parameter corresponds to 'CSI-RS-ResourceRep' of L1 parameter. iii) The CSI report configuration-related information includes a reportConfigType parameter representing a time domain behavior and a reportQuantity parameter representing a CSI-related quantity for reporting. The time domain behavior may be periodic, aperiodic, or semi-persistent.

The CSI report configuration-related information may be expressed as CSI-ReportConfig IE and Table 14 below shows an example of CSI-ReportConfig IE.

TABLE 9

```
-- ASN1START
-- TAG-CSI-RESOURCECONFIG-START
CSI-ReportConfig ::=            SEQUENCE {
    reportConfigId                  CSI-ReportConfigId,
    carrier                         ServCellIndex                   OPTIONAL,
    -- Need S
    resourcesForChannelMeasurement  CSI-ResourceConfigId,
    csi-IM-ResourcesForInterference CSI-ResourceConfigId            OPTIONAL,   -- Need R
    nzp-CSI-RS-ResourcesForInterference CSI-ResourceConfigId        OPTIONAL,   -- Need R
    reportConfigType                CHOICE {
        periodic                        SEQUENCE {
            reportSlotConfig                CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUCCH           SEQUENCE {
            reportSlotConfig                CSI-ReportPeriodicityAndOffset,
            pucch-CSI-ResourceList          SEQUENCE (SIZE (1..maxNrofBWPs)) OF PUCCH-CSI-Resource
        },
        semiPersistentOnPUSCH           SEQUENCE {
            reportSlotConfig                ENUMERATED {sl5, sl10, sl20, sl40, sl80, sl160, sl320},
            reportSlotOffsetList            SEQUENCE (SIZE (1.. maxNrofUL-Allocations)) OF INTEGER(0..32 ,
            p0alpha                         P0-PUSCH-AlphaSetId
        },
        aperiodic                       SEQUENCE {
            reportSlotOffsetList            SEQUENCE (SIZE (1..maxNrofUL-Allocations)) OF INTEGER(0..32)
        }
    },
    reportQuantity                  CHOICE {
        none                            NULL,
        cri-RI-PMI-CQI                  NULL,
        cri-RI-i1                       NULL,
        cri-RI-i1-CQI                   SEQUENCE {
            pdsch-BundleSizeForCSI          ENUMERATED {n2, n4}     OPTIONAL
        },
        cri-RI-CQI                      NULL,
        cri-RSRP                        NULL,
        ssb-Index-RSRP                  NULL,
        cri-RI-LI-PMI-CQI               NULL
    },
```

The UE measures CSI based on configuration information related to the CSI (2020). The CSI measurement may include (1) a CSI-RS reception process of the UE (S2022) and (2) a process of computing the CSI through the received CSI-RS (S2024), and a detailed description thereof will be given later.

For the CSI-RS, resource element (RE) mapping of the CSI-RS resource is configured in time and frequency domains by higher layer parameter CSI-RS-ResourceMapping.

Table 10 shows an example of CSI-RS-ResourceMapping IE.

TABLE 10

```
-- ASN1START
-- TAG-CSI-RS-RESOURCEMAPPING-START
CSI-RS-ResourceMapping ::=      SEQUENCE {
    frequencyDomainAllocation       CHOICE {
        row1                            BIT STRING (SIZE (4) ) ,
        row2                            BIT STRING (SIZE (12) ) ,
        row4                            BIT STRING (SIZE (3) ) ,
        other                           BIT STRING (SIZE (6) )
    },
    nrofPorts                       ENUMERATED {p1,p2,p4,p8,p12,p16,p24,p32},
    firstOFDMSymbolInTimeDomain     INTEGER (0..13),
    firstOFDMSymbolInTimeDomain2    INTEGER (2..12)
                                    OPTIONAL,   -- Need R
    cdm-Type                        ENUMERATED (noCDM, fd-CDM2, cdm4-FD2-TD2, cdm8-FD2-TD4},
```

TABLE 10-continued

```
density              CHOICE {
   dot5                ENUMERATED {evenPRBs, oddPRBs},
   one                 NULL,
   three               NULL,
   spare               NULL
},
freqBand             CSI-FrequencyOccupation,
...
}
```

In Table 10, a density (D) represents a density of the CSI-RS resource measured in RE/port/physical resource block (PRB), and nrofPorts represents the number of antenna ports.

the UE reports the measured CSI to the base station (S2030).

Here, when the quantity of CSI-ReportConfig in Table E is configured as 'none (or No report)', the UE may skip the report.

However, even when the quantity is configured as 'none (or No report)', the UE may report to the base station.

The case where the quantity is configured as 'none' is a case of triggering aperiodic TRS or a case where repetition is configured.

Here, only in a case where the repetition is configured as 'ON', the UE may skip the report.

CSI Measurement

The NR system supports more flexible and dynamic CSI measurement and reporting. Here, The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported. A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching. In addition, in ZP CSI-RS based IMR, each port emulates an interference layer having (a preferable channel and) precoded NZP CSI-RS. This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList). the CSI resource setting corresponds to the CSI-RS-resourcesetlist. Here, S represents the number of configured CSI-RS resource sets. Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id. In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent. The number S of configured CSI-RS resource sets is limited to '1' with respect to periodic and semi-persistent CSI resource settings. Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.
NZP CSI-RS resource for interference measurement.
NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI Computation

When interference measurement is performed on CSI-IM, each CSI-RS resource for channel measurement is associated with the CSI-IM resource for each resource by an order of CSI-RS resources and CSI-IM resources within a corresponding resource set. The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.
Each NZP CSI-RS port configured for interference measurement corresponds to an interference transport layer.
In all interference transport layers of the NZP CSI-RS port for interference measurement, an energy per resource element (EPRE) ratio is considered.
Different interference signals on RE(s) of the NZP CSI-RS resource for channel measurement, the NZP CSI-RS resource for interference measurement, or CSI-IM resource for interference measurement.

CSI Reporting

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states. In the aperiodicTriggerStateList, each trigger state includes the channel and an associated CSI-ReportConfigs list optionally indicating resource set IDs for interference. In the semiPersistentOnPUSCH-TriggerStateList, each trigger state includes one associated CSI-ReportConfig.

In addition, the time domain behavior of CSI reporting supports periodic, semi-persistent, and aperiodic.

i) The periodic CSI reporting is performed on short PUCCH and long PUCCH. The periodicity and slot offset of the periodic CSI reporting may be configured as RRC and refer to the CSI-ReportConfig IE.

ii) SP(semi-periodic) CSI reporting is performed on short PUCCH, long PUCCH, or PUSCH.

In the case of SP CSI on the short/long PUCCH, the periodicity and the slot offset are configured by the RRC and the CSI reporting is activated/deactivated by separate MAC CE/DCI.

In the case of the SP CSI on the PUSCH, the periodicity of the SP CSI reporting is configured as the RRC, but the slot offset is not configured as the RRC and the SP CSI reporting is activated/deactivated by DCI (format 0_1). For SP CSI reporting on PUSCH, a separate RNTI (SP-CSI C-RNTI) is used.

An initial CSI reporting timing follows a PUSCH time domain allocation value indicated in the DCI and a subsequent CSI reporting timing follows a periodicity configured as the RRC.

DCI format 0_1 may include a CSI request field and may activate/deactivate a specific configured SP-CSI trigger state. The SP CSI reporting has the same or similar activation/deactivation as a mechanism having data transmission on SPS PUSCH.

iii) The aperiodic CSI reporting is performed on the PUSCH and is triggered by the DCI. In this case, information related to the trigger of the aperiodic CSI reporting may be delivered/indicated/configured through the MAC-CE.

In the case of AP CSI having AP CSI-RS, an AP CSI-RS timing is configured by the RRC, and a timing for the AP CSI reporting is dynamically controlled by the DCI.

In the NR, a scheme (for example, transmitting RI, WB PMI/CQI, and SB PMI/CQI in order) of dividing and reporting the CSI in multiple reporting instances applied to PUCCH-based CSI reporting in the LTE is not applied. Instead, the NR restricts specific CSI reporting not to be configured in the short/long PUCCH and a CSI omission rule is defined. In addition, in relation with the AP CSI reporting timing, a PUSCH symbol/slot location is dynamically indicated by the DCI. In addition, candidate slot offsets are configured by the RRC. For the CSI reporting, slot offset(Y) is configured for each reporting setting. For UL-SCH, slot offset K2 is configured separately.

Two CSI latency classes (low latency class and high latency class) are defined in terms of CSI computation complexity. In the case of Low latency CSI, it is a WB CSI including a maximum of 4 ports Type-I codebook or a maximum of 4-ports non-PMI feedback CSI. The high latency CSI refers to CSI other than the low latency CSI. For a normal UE, (Z, Z') is defined in a unit of OFDM symbols. Z represents a minimum CSI processing time from the reception of the aperiodic CSI triggering DCI to the execution of the CSI reporting. In addition, Z' represents a minimum CSI processing time from the reception of the CSI-RS for channel/interference to the execution of the CSI reporting.

With respect to CSI calculation and/or reporting, the operation related to the Z value and Z' related to the minimum time gap that guarantees (or sends) sufficient time for the UE to perform channel measurement and reporting when reporting aperiodic CSI and/or beam may be defined as follows.

UE CSI Computation Time

In case where the CSI request field on DCI triggers CSI report(s) on PUSCH, when the first uplink symbol for carrying the corresponding CSI report(s) including the effect of timing advance starts later than the symbol Zref, and when the first uplink symbol for carrying the n-th CSI report including the effect of timing advance starts later than the symbol Z'ref(n), the UE must provide a valid CSI report for the n-th triggered report.

Here, Zref is defined as the next uplink symbol having a CP starting after the end $T_{proc,CSI}=(Z)(2048+144)\cdot\kappa 2^{-\mu}\cdot T_c$ of the last symbol of the PDCCH triggering the CSI report(s), and Z'ref(n) is defined as the next uplink symbol having a CP starting after $T'_{proc,CSI}=(Z')(2048+144)\cdot\kappa 2^{-\mu}\cdot T_c$ of the last symbol in the earliest among aperiodic CSI-RS resource for channel measurements, aperiodic CSI-IM used for interference measurements, and aperiodic NZP CSI-RSs for interference measurement, when Aperiodic CSI-RS is used for channel measurement for n-th triggered CSI report.

When the PUSCH indicated by DCI overlaps with another PUCCH or PUSCH, when CSI report(s) is supported, it is multiplexed according to the procedure described in a predefined standard (e.g. 3GPP 38.213). Otherwise, the CSI report(s) is transmitted on the PUSCH indicated by DCI.

When the CSI request field on the DCI triggers the CSI report(s) on the PUSCH, if the first uplink symbol carrying the corresponding CSI report(s) including the effect of timing advance starts earlier than the symbol Zref, if any HARQ-ACK or transport block is not multiplexed on PUSCH, the UE may ignore the scheduling DCI.

When the CSI request field on the DCI triggers the CSI report(s) on the PUSCH, if the first uplink symbol for carrying the n-th CSI report including the effect of timing adbance starts earlier than the symbol Z'ref(n), the number of triggered reports is one, if no HARQ-ACK or transport block is multiplexed on PUSCH, the UE may ignore the corresponding DCI. Otherwise, the UE does not need to update the CSI for the n-th triggered CSI report.

Z, Z' and μ are defined as follows:

$$Z = \max_{m=0,\ldots,M-1}(Z(m)) \quad \text{and} \quad Z' = \max_{m=0,\ldots,M-1}(Z'(m)),$$

where M is the number of updated CSI report(s) according to a predefined standard, and (Z(m),Z'(m)) corresponds to the m-th updated CSI report and is defined as follows.

CSI is triggered without a PUSCH having a transport block, HARQ-ACK or both, when L=0 CPUs are occupied and the CSI to be transmitted is a single CSI and corresponds to wideband frequency-granularity, $(Z_1,Z'_1)$ in Table 11.

Here, CSI corresponds to a maximum of 4 CSI-RS ports in a single resource without the CSI report. And, here, CodebookType is configured as 'typeI-SinglePanel' or reportQuantity is configured as 'cri-RI-CQI'. or, When the CSI to be transmitted corresponds to wideband frequency-granularity, $(Z_1,Z_1)$ in Table 12.

Here, CSI corresponds to a maximum of 4 CSI-RS ports in a single resource without the CRI report. And, here, CodebookType is configured as 'typeI-SinglePanel' or reportQuantity is configured as 'cri-RI-CQI'. or, When reportQuantity is configured as 'cri-RSRP' or 'ssb-Index-RSRP', $(Z_3,Z'_3)$ in Table 12 where, as defined in a predefined standard (e.g. 3GPP TS 38.306), $X_\mu$ conforms with UE reported capability beamReportTiming, and $KB_1$ conforms with UE reported capability beamSwitchTiming. Or, Otherwise, $(Z_2,Z'_2)$ of Table 12.

μ of Tables 11 and 12 corresponds to min ($\mu_{PDCCH}$, $\mu_{CSI-RS}$, $\mu_{UL}$). Here, $\mu_{PDCCH}$ corresponds to the subcarrier spacing of the PDCCH through which DCI is transmitted, $\mu_{UL}$ corresponds to the subcarrier spacing of PUSCH through which CSI report can be transmitted, $\mu_{CSI-RS}$ corresponds to the minimum subcarrier spacing of aperiodic CSI-RS triggered by DCI.

Table 11 shows the CSI computation delay requirement 1.

TABLE 11

| | $Z_1$ [symbols] | |
|---|---|---|
| μ | $Z_1$ | $Z_1'$ |
| 0 | 10 | 8 |
| 1 | 13 | 11 |
| 2 | 25 | 21 |
| 3 | 43 | 36 |

Table 12 shows the CSI computation delay requirement 2.

TABLE 12

| | $Z_1$ [symbols] | | $Z_2$ [symbols] | | $Z_3$ [symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44 $X_3$ + $KB_1$) | $X_3$ |
| 3 | 97 | 85 | 152 | 140 | min(97 $X_4$ + $KB_2$) | $X_4$ |

As mentioned above, in the case of L1-SINR reporting corresponding to beam reporting, the minimum time gap required for the UE is defined as (Z3, Z3') in Table 12 above, the $X_\mu$ and $KB_1$ values may be defined as shown in Table 13 below (e.g. refer to 3GPP TS 38.306/TS 38.331). Here, $X_\mu$ may correspond to the beamReportTiming, and $KB_1$ may correspond to beamSwitchTiming.

Table 13 shows IE MIMO-ParametersPerBand. IE MIMO-ParametersPerBand may be used to deliver MINO-related parameters specified for the certain band.

TABLE 13

```
-- ASN1START
-- TAG-MIMO-PARAMETERSPERBAND-START
MIMO-ParametersPerBand ::=    SEQUENCE {
...
    beamReportTiming           SEQUENCE {
        scs-15kHz                  ENUMERATED {sym2, sym4, sym8}
OPTIONAL,
        scs-30kHz                  ENUMERATED {sym4, sym8, sym14, sym28}
```

TABLE 13-continued

```
OPTIONAL,
    scs-60kHz          ENUMERATED {sym8, sym14, sym28}
OPTIONAL,
    scs-120kHz         ENUMERATED {sym14, sym28, sym56}
OPTIONAL
    }
...
  beamSwitchTiming     SEQUENCE {
    scs-60kHz          ENUMERATED {sym14, sym28, sym48, sym224, sym336}
OPTIONAL,
    scs-120kHz         ENUMERATED {sym14, sym28, sym48, sym224, sym336}
OPTIONAL
    }
...
-- TAG-MIMO-PARAMETERSPERBAND-STOP
-- ASN1STOP
```

Here, beamReportTiming indicates the number of OFDM symbols between the last symbol of the SSB/CSI-RS and the first symbol of the transmission channel including the beam report. The UE includes the corresponding information for each supported subcarrier spacing. The beamSwitchTiming indicates the minimum number of OFDM symbols between DCI triggering of aperiodic CSI-RS and transmission of aperiodic CSI-RS. Additionally, the UE reports the number of CSIs that can be simultaneously calculated.

Hereinafter, the CSI Reporting configuration will be described.

Reporting Configurations

The UE should calculate (or operate) the CSI parameters (if reported) assuming the following dependencies between the CSI parameters (if reported).

LI should be calculated according to the reported CQI, PMI, RI and CRI.

CQI should be calculated according to the reported PMI, RI and CRI.

PMI should be calculated according to the reported RI and CRI.

RI should be calculated according to the reported CRI.

The reporting configuration for CSI may be aperiodic (using PUSCH), periodic (using PUCCH) or semi-persistent (using PUCCH and using DCI activation PUSCH). CSI-RS resources may be periodic, semi-persistent or aperiodic. Table 14 shows how supported CSI Reporting configurations and supported combinations of CSI-RS Resource configurations and CSI Reporting are triggered for each CSI-RS Resource configuration. The periodic CSI-RS is configured by higher layers. The semi-persistent CSI-RS is activated and deactivated as described in the predefined standard. The aperiodic CSI-RS is configured and triggered/activated as described in a predefined standard.

Table 14 shows the trigger/activation of CSI Reporting for possible CSI-RS configurations.

TABLE 14

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible, as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible, as defined in Subclause 5.2.1.5.1. |
| Aperiodic CSI-RS | Not Supported | Not Supported | Triggered by DCI: additionally, activation command [10, TS 38.321] possible, as defined in Subclause 5.2.1.5.1. |

Hereinafter, it will be describe information related to activation/deactivation/trigger by MAC-CE related to Semi-Persistent/Aperiodic CSI reporting.

Activation/Deactivation of Semi-Persistent CSI-RS/CSI-IM Resource Set

The base station (or network) may activate and deactivate the configured semi-persistent CSI-RS/CSI-IM resource set of the serving cell by transmitting the SP CSI-RS/CSI-IM resource set activation/deactivation MAC CE defined in the predefined standard (e.g. 3GPP TS 38.321). The configured Semi-persistent CSI-RS/CSI-IM resource set is initially deactivated after configuration and handover.

When the MAC entity receives the SP CSI-RS/CSI-IM resource set activation/deactivation MAC CE in in the MAC entity instructs (or transmits) information about the SP CSI-RS/CSI-IM resource set Activation/Deactivation MAC CE to the lower layer.

Aperiodic CSI Trigger State Subselection

The base station (or network) may select some of the aperiodic CSI trigger states configured in the serving cell by transmitting Aperiodic CSI Trigger State Subselection MAC CE defined in a predefined standard (e.g. 3GPP TS 38.321).

When the MAC entity receives the Aperiodic CSI Trigger State Subselection MAC CE in the serving cell, the MAC entity instructs (or transmits) information about the Aperiodic CSI Trigger State Subselection MAC CE to the lower layer.

Downlink Transmission/Reception Operation

FIG. 21 shows an example of a downlink transmission/reception operation.

the eNB schedules downlink transmission such as a frequency/time resource, a transport layer, a donwlink precoder, MCS, etc., (S2101). In particular, the eNB may determine a beam for PDSCH transmission to the UE through the aforementioned operations.

The UE receives Downlink Control Information (DCI) for downlink scheduling (i.e., including scheduling information of the PDSCH) on the PDCCH (S2102).

DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled and Single-user (SU)/Multi-user (MU) transmission scheduling is also available.

Further, a TCI field is configured by 3 bits and a maximum of 8 TCI states are indicated according to a TCI field value to dynamically the QCL for the DMRS.

The UE receives downlink data from the eNB on the PDSCH (S2103).

When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter 'dmrs-Type' in the UE and the DMRS type is used for receiving the PDSCH. Further, in the UE, the maximum number of front-loaded DMRS symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

Considering the beam report computation time described in the CSI report-related part, conceptually, Z, which is the time required from the time of receiving the latest transmitted resource among the channel measurement resource (CMR)(s) and the interference measurement resource (IMR)(s) to the time of reporting the beam, may be determined according to UE's capability information called beamReportTiming (i.e. the $X_\mu$).

For example, the beam report may be a report of a CSI-RS Resource Indicator (CRI)(s)/synchronization signal block resource indicator (SS/PBCH Block Resource indicator, SSBRI) (s) and/or layer1 reference signal received power (RSRP)(s). In the present disclosure, the beam report may refer to an operation of reporting beam information.

As an example, referring to Table 13 above, if the UE is 60 kHz subcarrier spacing (SCS), the UE may report whether 8 symbols are required, 14 symbols are required, or 28 symbols are required as UE capability information to the base station.

In addition, referring to the CSI operation time portion of the above-described UE, a Z value, which means the time required for the UE from the reception time of the DCI triggering the corresponding beam report to the actual beam report time, is fixed to 22 symbols and 33 symbols, respectively, in the case of 15 kHz SCS and 30 kHz SCS. In contrast, for 60 kHz SCS and 120 kHz SCS, the Z value may be defined by adding i) beamReportTiming value and ii) a beamSwitchTiming (i.e. the $KB_1$) value that is the UE capability information corresponding to the time required from the DCI reception time triggering aperiodic (AP) CSI-RS to the actual AP CSI-RS reception.

This is a value calculated assuming that DCI reception (triggering CSI-RS)==>AP CSI-RS resource(s) reception==>beam report (e.g. CRI (s) and/or L1-RSRP (s)) is performed. For example, the Z value is a value calculated on the assumption that DCI is received and beam report is performed after AP CSI-RS resource(s) are received.

Exceptionally, when the UE reports the beamSwitchTiming value as an excessively large value (224 symbols or 336 symbols), the fixed Z value of 44 symbols in 60 kHz SCS and 97 symbols in 120 kHz SCS may be used. This exception is possible, when the UE raises the beamSwitchTiming value to 224 symbols or 336 symbols, after DCI is received, the time required to change the beam after activating a panel for receiving the corresponding AP CSI-RS is taken into consideration and reported, when the panel to receive the AP CSI-RS of the corresponding UE is already activated, this is because AP CSI-RS reception is possible even in a much shorter time than the corresponding value.

In the case of the above-described calculation method, there may be technical errors in calculating the beam report calculation time. As an example, when calculating a beam report calculation time based on a plurality of CSI-RS resources (e.g. CRI(s)) and/or a plurality of SSB resources (e.g. SSBRI(s)), beamSwitchTiming may mean a time required from (DL RS resource triggering) DCI reception to first DL RS resource reception, and the beamReportTiming value may mean a time required from the last DL RS resource reception to reporting the beam. Accordingly, a problem may arise in which the minimum required time is calculated without including the delay time from the first symbol of the first DL RS resource to the last symbol of the last DL RS resource.

This problem did not have a significant impact for the following reasons when reporting the Rel-15-based L1-RSRP.

The L1-RSRP report selects and reports the DL RS resource only in the CMR (i.e. there is no IMR configuration), and the corresponding CMR is transmitted in the same slot. Accordingly, the time difference between the first transmitted downlink reference signal (DL RS) resource and the last DL RS resources among all DL RS resources to be measured is configured within a maximum of 1 slot (=14 symbols). The UE may increase the beamReportTiming value and the beamSwitchTiming value to large values in consideration of the worst case.

However, in Rel-16, the report on the beam is negotiated to support not only CRI(s)/SSBRI(s) and/or L1-RSRP(s) of at least one of CRI(s)/SSBRI(s) but also Layer 1 signal-to-noise and interference ratio (L1-SINR) reporting considering inter-beam interference, and accordingly, the information value reported by the UE to the base station may be a combination of one or more of the following.

Beam report scheme 1: CRI(s)/SSBRI(s) and/or L1-SINR(s) of at least one among CRI(s)/SSBRI(s)

Beam report scheme 2: CRI(s)/SSBRI(s), L1-SINR(s) of at least one among CRI(s)/SSBRI(s), and/or L1-RSRP(s) of at least one among CRI(s)/SSBRI(s)

Beam report method 3: CRI(s)/SSBRI(s), L1-SINR(s) of at least one among CRI(s)/SSBRI(s), the IMR index(s), and/or L1-RSRP(s) of at least one among CRI(s)/SSBRI(s)

The reported information value may be configured in various other ways. For example, reportQuantity may be configured as ssb-Index-SINR or CRI-sinr. And/or, reportQuantity may be configured as cri-RSRP or ssb-Index-RSRP.

Hereinafter, in the present disclosure, "reported information (or reporting information)" may be information composed of a combination of all or a part of one or more configuration values of the beam report schemes 1 to 3 described above.

Here, the IMR index(s) may be an index corresponding to N-th strongest or N-th weakest interference. Alternatively, the IMR index(s) may be an index corresponding to N strong or N weak interferences.

In addition, in terms of AP beam reporting, the characteristic difference between the beam report in Rel-16 and the beam report in Rel-15 is that not only the CMR(s) but also the IMR(s) can be configured.

When the IMR is configured, one or a plurality of ZP (zero-power) IMR (s) (analogous to LTE/NR CSI-IM) and/or one or a plurality of NZP (non-zero-power) CSI-RS IMR(s) may be configured. In addition, when the IMR is not configured and the L1-SINR report is triggered and/or configured, interference measurement may be performed through the CMR (that the UE selects/reports among a plurality of the CMRs).

When the IMR (s) is configured in relation to the beam report as described above, compared to Rel-15, which simply measures and compares received power information (e.g. RSRP) for a desired channel (i.e. a channel desiring to communicate with the base station), the UE may take more time for interference estimation and/or L1-SINR calculation/comparison.

Therefore, in relation to configuring and/or defining the minimum time (e.g. Z value, Z' value) required for beam report based on L1-RSRP and/or L1-SINR, the following schemes are proposed (hereinafter, the first to fifth embodiments).

Specifically, the present disclosure proposes a method of reporting capability information for each measurement metric, and/or defining the Z/Z' value differently according to the measurement metric (hereinafter, the first embodiment), and a method of reporting single capability information, and/or defining the Z/Z' value differently according to the measurement metric (hereinafter, the second embodiment), and, a method of defining the Z value based on the position of CMR/IMR (hereinafter, the third embodiment), and, a method of defining the Z/Z' value differently for the case of reporting only L1-SINR and the case of reporting both L1-SINR and L1-RSRP together (hereinafter, the fourth embodiment), and, a method of defining the Z/Z' value differently according to the IMR configuring scheme (hereinafter, the fifth embodiment).

Hereinafter, the embodiments described in the present disclosure are only separated for convenience of description, and it goes without saying that some methods and/or components of one embodiment may be substituted with methods and/or components of other embodiments, or may be applied in combination with each other.

In the present disclosure, L1-RSRP report and/or L1-SINR report means a beam report based on L1-RSRP and/or a beam report based on L1-SINR.

In the present disclosure, 'A/B' may be interpreted as 'A and B', 'A or B' and/or 'A and/or B'.

First Embodiment

First, a method of reporting the capability information for each measurement metric and/or defining the Z/Z' value differently according to the measurement metric will be described. For example, the capability information may be beamReportTiming capability. For example, the measurement metric may mean L1-RSRP and/or L1-SINR.

Hereinafter, the methods described are merely separated for convenience, and it goes without saying that the configuration of one method may be substituted with the configuration of another method, or may be applied in combination with each other.

The UE may be configured to separately report beamReportTiming capability for L1-RSRP report and beamReportTiming capability for L1-SINR report.

And/or, the Z and/or Z' value may be defined differently (linked to each capability) based on whether the corresponding AP (aperiodic) beam report configured/indicated by the base station is an L1-RSRP report or an L1-SINR report. Based on this, the UE may transmit the AP beam report to the base station. For example, whether the corresponding AP beam report is an L1-RSRP report or an L1-SINR report may be configured and/or indicated through RRC signaling and/or DCI. For example, Z may mean the minimum CSI operation/processing/calculation time until reporting after receiving downlink control information (DCI) triggering aperiodic CSI. Z' may mean the minimum CSI operation/processing/calculation time until reporting after receiving the CSI-RS for channel measurement/interference measurement. In the present disclosure, the Z/Z' may be referred to as a minimum required time.

For example, the UE may transmit a beam report (via PUSCH) to the base station in a time resource (e.g. slot, symbol, sub-symbol, etc.) determined based on the Z and/or Z' value. Here, the AP beam report may mean a beam report configured to the UE aperiodically for beam management, etc. The reported information may be one or more combination of the beam report schemes 1 to 3.

And/or, the beamReportTiming capability value for the L1-SINR report may be replaced with information on the number of symbols additionally required compared to the beamReportTiming value for the L1-RSRP report. As an example, the UE may report a differential value and/or an offset value compared to the beamReportTiming capability value for L1-RSRP report as the beamReportTiming capability value for L1-SINR report.

Second Embodiment

Next, a method of reporting the single capability information and/or defining the Z/Z' value differently according to a measurement metric will be described. For example, the capability information may be beamReportTiming capability. For example, the measurement metric may mean L1-RSRP and/or L1-SINR.

Hereinafter, the methods to be described are merely separated for convenience, and it goes without saying that the configuration of one method may be substituted with the configuration of another method, or may be applied in combination with each other.

The UE reports a single beamReportTiming capability, and the Z and/or Z' value may be defined differently based on whether the corresponding AP beam report is an L1-RSRP report or an L1-SINR report. Based on this, the UE may transmit the AP beam report to the base station.

And/or, the UE reports a single beamReportTiming capability for each SCS, and the Z and/or Z' value may be defined differently based on whether the corresponding AP beam report is an L1-RSRP report or an L1-SINR report. Here, to be differently defined may mean that the Z and/or Z' are defined in different ways according to the report metric (L1-RSRP or L1-SINR). For example, under certain conditions and/or circumstances (e.g. when SCSs are the same), the Z and/or Z' values may have the same value in the L1-RSRP report and the L1-SINR report.

For example, the UE may transmit a beam report (via PUSCH) to the base station in a time resource (e.g. slot, symbol, sub-symbol, etc.) determined based on the Z and/or Z' value. Here, the AP beam report may mean a beam report configured to the UE aperiodically for beam management, etc. The reported information may be one or more of combination of the beam report schemes 1 to 3.

And/or, the Z and/or Z' value to be applied when reporting based on L1-SINR may be greater than or equal to the Z and/or Z' value to be applied when reporting based on L1-RSRP.

And/or, the Z and/or Z' value to be applied when reporting based on the L1-SINR may be a value obtained by adding a specific constant value (configured/defined per SCS) (e.g. 1 or 2 symbols) to the Z and/or Z' value to be applied when reporting based on the L1-RSRP.

And/or, the Z and/or Z' value to be applied when reporting based on L1-SINR may be a value obtained by adding a specific value (e.g. X*Y symbols, X=1 or 2 depending on SCS, Y=number of IMRs) defined/determined (per SCS) according to the number of IMRs and/or CMRs to the Z and/or Z' values to be applied when reporting based on L1-RSRP.

And/or, there may be a case where a transmission time difference between a resource transmitted at the earliest (i.e. at the earliest time) and a resource transmitted at the latest (i.e. at the latest time) among the IMR and CMR is large. And/or, the IMRs and CMRs may be allowed to be configured in different slots. In this case, as described above, the problem of lack of Z and/or Z' due to the time difference between the first DL RS resource and the last DL RS resource may be further exacerbated.

Accordingly, the following third embodiment is proposed.

Third Embodiment

Next, a method of defining the Z value based on the location of the CMR/IMR will be described.

Hereinafter, the methods to be described are merely separated for convenience, and it goes without saying that the configuration of one method may be substituted with the configuration of another method, or may be applied in combination with each other.

Hereinafter, in the third embodiment, 'Z value' may be replaced with 'Z' value' or 'Z and Z' value'.

According to the location of the earliest symbol and/or resource among the CMRs and IMRs, and the location of the last symbol and/or resource among the CMRs and IMRs, the Z value is changed as in Method 1 to Method 2.

And/or, in the case of L1-SINR report, according to the location of the earliest symbol and/or resource among the CMRs and IMRs, and the location of the last symbol and/or resource among the CMRs and IMRs, the Z value is changed as in Method 1 to Method 2.

(Method 1)

When a transmission slot location between the CMR and the IMR is different, a method of increasing the Z value by a slot offset may be considered. For example, when the CMR and IMR are transmitted/received in different slots, and/or when the earliest symbol and/or resource among the CMRs and/or IMRs and the latest symbol and/or resource among the CMRs and/or IMRs are located in different slots, a method of increasing the Z value by the slot offset may be considered. For example, the slot offset may mean an interval between slots and may be defined as the number of slots.

(Method 2)

When obtaining the Z value at a specific SCS (e.g. 60 kHz, 120 kHz), a method of using a value obtained by adding the location of the latest symbol and/or resource among the CMRs and/or IMRs—the location of the earliest symbol and/or resource among the CMRs and/or IMRs to the existing value (e.g. beamReportTiming and/or beamSwitchTiming) as the Z value may be considered.

And/or, when obtaining the Z value at a specific SCS (e.g. 60 kHz, 120 kHz), a method of using a value obtained by adding a value obtained by subtracting an x symbol from the location of the latest symbol and/or resource among the CMRs and/or IMRs—the location value of the earliest symbol and/or resource among the CMRs and/or IMRs to the existing value (e.g. beamReportTiming and/or beamSwitchTiming) as the Z value may be considered. For example, x may be 1 or 2.

And/or along with information (e.g. beam ID(s), beam index(s)) for identifying the beam, when both i) the case of reporting only L1-SINR(s) and ii) the case of reporting both L1-SINR(s) and L1-RSRP(s) together are supported, when reporting the L1-SINR(s) and the L1-RSRP(s) together, since the UE needs to perform both calculations for both metrics (i.e. L1-SINR(s), L1-RSRP(s)), more calculation time may be required.

Therefore, the following fourth embodiment is proposed.

Fourth Embodiment

Next, a method of defining the Z/Z' value differently for the case of reporting only L1-SINR and the case of reporting both L1-SINR and L1-RSRP will be described.

Hereinafter, the methods to be described are merely separated for convenience, and it goes without saying that the configuration of one method may be substituted with the configuration of another method, or may be applied in combination with each other.

i) When reporting only L1-SINR(s) and ii) when reporting L1-SINR(s) and L1-RSRP(s) together with the beam ID(s), the Z and/or Z' values may be determined differently.

For example, for the case of reporting together the L1-SINR(s) and L1-RSRP(s) compared to the Z and/or Z' values defined to be applied in the case of reporting only L1-SINR(s), a value of Z and/or Z' incremented by a (preconfigured/defined) specific constant/variable value is applied. For example, when reporting L1-SINR(s) and L1-RSRP(s) together, the Z and/or Z' values defined to apply when only reporting L1-SINR(s) incremented by one symbol may be applied as the Z and Z' values.

In addition, in Rel-16, for the IMR configuration for the beam report in consideration of L1-SINR, the following four cases (some of) may be supported. (hereinafter, Case 1 to Case 4)

(Case 1) When dedicated IMR is not configured, the UE measures interference from the CMR. For example, the CMR may be similar to CSI-SINR defined in a predefined standard (e.g. 3GPP TS 38.215).

(Case 2) When dedicated IMR(s) are configured and the IMR(s) is based only on ZP (zero power) (CSI-RS) (NZP (CSI-RS) based only), the UE measures interference from IMR(s) and/or the CMR(s). For example, ZP may be similar to CSI-IM in NR/LTE.

(Case 3) When dedicated IMR(s) are configured and the IMR(s) is based only on NZP (non-zero power) (CSI-RS) (NZP (CSI-RS) based only), the UE measures interference from IMR(s) and/or the CMR(s). For example, the NZP may be similar to NZP CSI-RS based IMR in NR.

(Case 4) When dedicated IMRs are configured and the IMRs include both NZP (CSI-RS)-based and ZP (CSI-RS)-based, the UE measures interference from IMR(s) and/or the CMR(s).

At this time, the Z and/or Z' values required in each case related to the IMR configuration or a specific case may be specified/defined differently. (Hereinafter, a fifth embodiment).

Fifth Embodiment

Next, a method of defining the Z/Z' value differently according to the IMR configuration method will be described.

Hereinafter, the methods to be described are merely separated for convenience, and it goes without saying that the configuration of one method may be substituted with the configuration of another method, or may be applied in combination with each other.

For the L1-SINR report, the Z and/or Z' values may be configured/defined differently according to the four IMR configuration methods (Case 1 to Case 4). And/or, the same Z and/or Z' values may be configured/defined for some of the four IMR configuration methods.

For example, since it may take more time for computations for dedicated NZP IMR than for dedicated ZP IMR, a larger value may be specified/defined/configured. And/or, when both the dedicated ZP IMR and the dedicated NZP IMR are configured, a larger value may be applied. And/or, if there is no dedicated IMR configuration, since there is not much difference in the amount of computation compared to the existing L1-RSRP, the same Z and/or Z' values as when reporting the L1-RSRP may be applied.

For example, the Z and/or Z' values applied for Case 1 may be configured to be the same as the value(s) applied when reporting L1-RSRP (since there is no separate IMR configuration).

For example, the Z and/or Z' value applied for Case 3 may be a value increased by a specific offset value (e.g. 1 symbol) to the Z and/or Z' value defined for Case 1 and/or Case 2.

For example, the Z and/or Z' may be determined as the largest value for Case 4. In this case, the applied value may be a value increased by a specific offset value (e.g. 1 symbol) to the values defined for Case 1, Case 2, and/or Case 3.

And/or, the above-mentioned proposals (the first to fifth embodiments) may be applied in combination with each other. That is, the Z and/or Z' values may be configured by combining the methods proposed in one or more embodiments.

For example, i) the first to fourth embodiments proposing method(s) for configuring the Z and/or Z' values in consideration of L1-SINR report and ii) the fifth embodiment proposing method(s) for configuring the Z and/or Z' value in consideration of IMR configuration when reporting L1-SINR may be combined and applied. Specifically, when L1-SINR report and IMR configuration (e.g. the four cases in the fifth embodiment, etc.) are considered, the Z and/or Z' values may be values in which the specific offset value described in the above-described fifth embodiment is increased with respect to the Z and/or Z' values configured/defined/determined through the method proposed in the above-described first to fourth embodiments. Or, vice versa.

Signaling Procedure Related to Embodiment(s)

FIG. 22 shows an example of signaling between a user equipment (UE)/a base station (BS) for performing CSI report (i.e. including beam report) based on the above-described proposed methods (e.g. the first to fifth embodiments, etc.). FIG. 22 is only for convenience of description, and does not limit the scope of the present disclosure. In addition, some step(s) shown in FIG. 22 may be omitted or merged according to circumstances and/or configuration, etc. In the present disclosure, CSI report (or beam report) may refer to an operation of reporting beam information.

UE Operation

The UE may report UE capability information to the base station (S2201). For example, the UE may report the UE capability information (or capability information) related to CSI report (i.e. beam report) to the base station. For example, as in the above-described method (e.g. the first to fifth embodiments), the UE may report information about BeamReportTiming, BeamSwitchTiming used to determine/calculate the calculation time required for the CSI report (i.e. beam report) to the base station (e.g. refer to the CSI-related operation section above).

The UE may receive CSI and/or beam management (BM)-related configuration from the base station (S2202). As described above, the UE may receive configuration information related to CSI reporting (e.g. CSI Reporting Setting, RRC parameter set CSI-ReportConfig, etc.) from the base station through RRC signaling (e.g. refer to the CSI-related operation section above). For example, the CSI-related configuration may include information related to resource configuration related to CSI reporting (e.g. CMR/IMR-related configuration), information (e.g. offset, specific value, etc.) related to the configuration/determination of the minimum time required for CSI report (i.e. beam report) as in the method (e.g. the first to fifth embodiments) described above in the present disclosure.

The UE may receive at least one CSI-RS from the base station (S2203), and based on the received CSI-RS, the UE may calculate the CSI to be reported to the base station (S2204). In this case, the UE may calculate CSI based on CSI-related information (e.g. CSI-related configuration, etc.) transmitted through higher layer signaling and/or DCI, a predefined rule, etc.

For example, the UE may perform channel estimation, interference measurement, etc. using the methods described in the above-described method (e.g. the first to fifth embodiments). Specifically, as in the above-described method (e.g. the first to fifth embodiments), the UE may perform the channel estimation, the interference estimation, etc. according to the CMR/IMR configuration in consideration of the minimum time required for the CSI report (i.e. beam report).

The UE may report the calculated CSI to the base station (S2205). For example, as in the above-described method (e.g. the first to fifth embodiments), the UE may perform the CSI report (i.e. beam report) configured with one or more combinations of the beam report schemes 1 to 3 above. That is, the UE may transmit the beam report based on beam information (e.g. beam ID(s)), L1-RSRP, and/or L1-SINR to the base station. In addition, the CSI report (i.e. beam report) may be performed at a time (e.g. slot, subslot, symbol, etc.) determined/calculated based on the schemes described in the above-described method (e.g. the first to fifth embodiments).

BS Operation

The base station may receive a report of UE capability information from the UE (S2201). For example, the base station may receive a report of UE capability information, etc. related to the CSI report (i.e. beam report) from the UE. For example, as in the above-described method (e.g. the first to fifth embodiments), the BS may receive information about BeamReportTiming, BeamSwitchTiming, etc. used to determine/calculate the calculation time required for the CSI report (i.e. beam report) from the UE (e.g. refer to the CSI-related operation section above).

The base station may transmit CSI and/or beam management (BM)-related configuration to the UE (S2202). As described above, the base station may transmit configuration information (e.g. CSI Reporting Setting, RRC parameter set CSI-ReportConfig, etc.) related to CSI reporting to the UE through RRC signaling, etc. (e.g. refer to the CSI-related operation section above). For example, the CSI-related configuration may include information related to resource configuration related to the CSI reporting (e.g. CMR/IMR-related configuration), information (e.g. offset, specific value, etc.) related to configuration/determination of a minimum time required for the CSI report (i.e. beam report), etc. as in the method (e.g. the first to fifth embodiments) described above in the present disclosure.

The base station may transmit at least one CSI-RS to the UE (S2203), and may receive the CSI report (i.e. beam report) calculated/determined by the UE (S2205). For example, the CSI report may be calculated/determined by performing channel estimation, interference measurement, etc. using the schemes described in the above-described method (e.g. the first to fifth embodiments) by the UE. Specifically, the CSI report may be based on channel estimation, interference estimation, etc. according to the CMR/IMR configuration performed in consideration of the minimum time required for the CSI report (i.e. beam report), etc. as the above-described method (e.g. the first to fifth embodiments).

In this case, the CSI report may be configured by one or more combinations of the beam report schemes 1 to 3 as the above-described method (e.g. the first to fifth embodiments). That is, the base station may receive a beam report based on beam information (e.g. beam ID(s)), L1-RSRP, and/or L1-SINR from the UE. In addition, the CSI report (i.e. beam report) may be performed at a determined/calculated time point (e.g. slot, subslot, symbol, etc.) based on the scheme described in the above-described method (e.g. the first to fifth embodiments).

In addition, the above-described base station operation and/or UE operation (e.g. the first to fifth embodiments and/or FIG. 22, etc.) may be implemented by a device (e.g. FIGS. 25 to 29) to be described below. For example, the base station may correspond to a transmitting device/first device, and the UE may correspond to a receiving device/second device, and vice versa may be considered in some cases. In addition, the above-described operations of the base station and/or the UE (e.g. the first to fifth embodiments and/or FIG. 22, etc.) are performed by the processor 1020/2020 of FIG. 26.

It may be processed by the processor 2310 of FIG. 26 or the control unit 1200 of FIG. 29, and the operations of the base station and/or the UE (e.g. the first to fifth embodiments and/or FIG. 22, etc.) may be stored in the memory (e.g. the memory 1020/2020 of FIG. 26, the memory unit 1300 of FIG. 29) in the form of instructions/programs (e.g. instruction, executable code) for driving at least one processor of FIGS. 25 to 29.

FIG. 23 is a flowchart for illustrating an operation method of a UE proposed in the present disclosure.

Referring to FIG. 23, first, the UE (1000/2000 in FIGS. 25 to 29) may receive downlink control information (DCI) for triggering a beam report from the base station (S2301).

For example, the operation of receiving the DCI by the UE in step S2301 may be implemented by devices of FIGS. 25 to 29 to be described below. For example, referring to FIG. 26, one or more processors 1020 may control one or more memories 1040 and/or one or more RF units 1060, etc. to receive the DCI, and the one or more RF units 1060 may receive the DCI.

And/or, the UE (1000/2000 in FIGS. 25 to 29) may receive a beam report-related resource from the base station (S2302). For example, the beam report-related resource may be a Channel State Information-Reference Signal (CSI-RS) resource or a Synchronization Signal Block (SSB) (or SS/PBCH Block, SSB) resource.

For example, the operation of receiving the beam report-related resource by the UE in step S2302 may be implemented by the devices of FIGS. 25 to 29 to be described below. For example, referring to FIG. 26, one or more processors 1020 may control one or more memories 1040 and/or one or more RF units 1060, etc. to receive the beam report-related resource, and the one or more RF units 1060 may receive the beam report-related resource.

And/or, the UE (1000/2000 in FIGS. 25 to 29) may report first beam information or second beam information to the base station based on the beam report-related resource (S2303). For example, the first beam information or the second beam information may mean channel state information (CSI). For example, the operation of reporting the beam information (the first beam information or the second beam information) may be all or partly the same as the above-described CSI-related operation.

For example, the first beam information may include an indicator of a beam report-related resource, received power information, and noise and interference information, and may be reported based on a first minimum required time for the beam report. The second beam information may include the indicator of a beam report-related resource and the noise and interference information, and may be reported based on a second minimum required time for the beam report.

For example, the received power information may include a reference signal received power (RSRP). For example, the RSRP may be the RSRP of the beam report-related resource indicated by the indicator of the beam report-related resource. For example, the received power information may include one or more beam report-related resource indicators and one or more RSRPs.

For example, the noise and interference information may include a Signal to Interference Noise Ratio (SINR). For example, the SINR may be the SINR of the beam report-related resource indicated by the indicator of the beam report-related resource. For example, the noise and interference information may include indicators of one or more beam report-related resources and one or more SINRs.

For example, the indicator of the beam report-related resource may be a channel state information resource indicator (CRI) or a synchronization signal block resource indicator (SSBRI) (or SS/PBCH Block Resource Indicator (SSBRI).

And/or, the first minimum required time may have a different value from the second minimum required time. For example, the first minimum required time may have a value greater than or equal to the second minimum required time. As another example, the first minimum required time may be a value obtained by adding 1 symbol to the second minimum required time. For example, the first minimum required time and the second minimum required time may be configured as the number of symbols. For example, the second minimum required time may correspond to Z1/Z1', Z2/Z2', or Z3/Z3' of Table 11 or 12.

And/or, the beam report may be an aperiodic beam report.

For example, the operation of reporting the first beam information or the second beam information by the UE in step S2303 may be implemented by the devices of FIGS. 25 to 29 to be described below. For example, referring to FIG. 26, one or more processors 1020 may control one or more memories 1040 and/or one or more RF units 1060, etc. to report the first beam information or the second beam information, and the one or more RF units 1060 may report the first beam information or the second beam information.

Since the operation of the UE described with reference to FIG. 23 is the same as that of the UE described with reference to FIGS. 1 to 22 (e.g. the first to fifth embodiments), a detailed description other than that is omitted.

The above-described signaling and operation may be implemented by the device (e.g. FIGS. 25 to 29) to be described below. For example, the above-described signaling and operation may be processed by one or more processors 1010 and 2020 of FIGS. 25 to 29, and the above-described signaling and operation may be stored in a memory (e.g. 1040, 2040) in the form of an instruction/program (e.g. instruction, executable code) for driving at least one processor (e.g. 1010, 2020) of FIGS. 25 to 29.

For example, a device comprising one or more memories and one or more processors functionally connected to the one or more memories, wherein the one or more processors is configured to cause the device to receive downlink control information for triggering a beam report from a base station, receive a beam report-related resource from the base station, and report first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

As another example, a non-transitory computer-readable medium (CRM) storing one or more instructions, wherein the one or more instructions, which are executable by one or more processors, are configured to cause a user equipment (UE) to receive downlink control information for triggering a beam report from a base station, receive a beam report-related resource from the base station, and report first beam information or second beam information to the base station based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

FIG. 24 is a flow chart illustrating an operation method of a base station proposed in the present disclosure.

Referring to FIG. 24, first, the base station (1000/2000 in FIGS. 25 to 29) may transmit downlink control information (DCI) for triggering a beam report to the UE (S2401).

For example, the operation of transmitting the DCI by the base station in step S2401 may be implemented by devices of FIGS. 25 to 29 to be described below. For example, referring to FIG. 26, one or more processors 1020 may control one or more memories 1040 and/or one or more RF units 1060, etc. to transmit the DCI, and the one or more RF units 1060 may transmit the DCI.

And/or, the base station (1000/2000 in FIGS. 25 to 29) may transmit a beam report-related resource to the UE (S2402). For example, the beam report-related resource may be a Channel State Information-Reference Signal (CSI-RS) resource or a Synchronization Signal Block (SSB) (or SS/PBCH Block, SSB) resource.

For example, the operation of transmitting the beam report-related resource by the base station in step S2402 may be implemented by the devices of FIGS. 25 to 29 to be described below. For example, referring to FIG. 26, one or more processors 1020 may control one or more memories 1040 and/or one or more RF units 1060, etc. to transmit the beam report-related resource, and the one or more The RF unit 1060 may transmit the beam report-related resource.

And/or, the base station (1000/2000 in FIGS. 25 to 29) may receive first beam information or second beam information from the UE based on the beam report-related resource (S2403). For example, the first beam information or the second beam information may mean channel state information (CSI). For example, the operation of reporting the beam information (the first beam information or the second beam information) may be all or partly the same as the above-described CSI-related operation.

For example, the first beam information may include an indicator of a beam report-related resource, received power information, and noise and interference information, and may be reported based on a first minimum required time for the beam report. The second beam information may include an indicator of a beam report-related resource and the noise and interference information, and may be reported based on a second minimum required time for the beam report.

For example, the received power information may include a reference signal received power (RSRP). For example, the RSRP may be the RSRP of the beam report-related resource indicated by the indicator of the beam report-related resource. For example, the received power information may include one or more beam report-related resource indicators and one or more RSRPs.

For example, the noise and interference information may include a Signal to Interference Noise Ratio (SINR). For example, the SINR may be the SINR of the beam report-related resource indicated by the indicator of the beam report-related resource. For example, the noise and interference information may include indicators of one or more beam report-related resources and one or more SINRs.

For example, the indicator of the beam report-related resource may be a channel state information resource indicator (CRI) or a synchronization signal block resource indicator (SSBRI) (or SS/PBCH Block Resource Indicator, SSBRI).

And/or the first minimum required time may have a different value from the second minimum required time. For example, the first minimum required time may have a value greater than or equal to the second minimum required time. As another example, the first minimum required time may be a value obtained by adding 1 symbol to the second minimum required time. For example, the first minimum required time and the second minimum required time may be configured as the number of symbols. For example, the second minimum required time may correspond to Z1/Z1', Z2/Z2', or Z3/Z3' of Table 11 or 12.

And/or, the beam report may be an aperiodic beam report.

For example, the operation of receiving the first beam information or the second beam information by the base station in step S2403 may be implemented by the devices of FIGS. 25 to 29 to be described below. For example, referring to FIG. 26, the one or more processors 1020 may control one or more memories 1040 and/or one or more RF units 1060, etc. to receive the first beam information or the second beam information, and the one or more RF units 1060 may receive the first beam information or the second beam information.

Since the operation of the base station described with reference to FIG. 24 is the same as that of the base station described with reference to FIGS. 1 to 23 (e.g. the first to fifth embodiments), a detailed description other than that is omitted.

The above-described signaling and operation may be implemented by the device (e.g. FIGS. 25 to 29) to be described below. For example, the above-described signaling and operation may be processed by one or more processors 1010 and 2020 of FIGS. 25 to 29, and the above-described signaling and operation may be stored in a memory (e.g. 1040, 2040) in the form of an instruction/program (e.g. instruction, executable code) for driving at least one processor (e.g. 1010, 2020) of FIGS. 25 to 29.

For example, a device comprising one or more memories and one or more processors functionally connected to the one or more memories, wherein the one or more processors is configured to cause the device to transmit downlink control information for triggering a beam report to a UE, transmit a beam report-related resource to the UE, and receive first beam information or second beam information from the UE based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

As another example, a non-transitory computer-readable medium (CRM) storing one or more instructions, wherein the one or more instructions, which are executable by one or more processors, are configured to cause a base station to transmit downlink control information for triggering a beam report to a UE, transmit a beam report-related resource to the UE, and receive first beam information or second beam information from the UE based on the beam report-related resource, wherein the first beam information includes an indicator of a beam report-related resource, received power information, and noise and interference information, and is reported based on a first minimum required time for the beam report, wherein the second beam information includes the indicator of a beam report-related resource, and the noise and interference information, and is reported based on a second minimum required time for the beam report, and wherein the first minimum required time has a different value from the second minimum required time.

Example of Communication System to which the Present Disclosure is Applied

Although not limited thereto, but various descriptions, functions, procedures, proposals, methods, and/or operation flowcharts described in the present disclosure can be applied to various fields requiring wireless communication/connection (e.g., 5G) between devices.

Hereinafter, the communication system will be described in more detail with reference to drawings. In the following drawings/descriptions, the same reference numerals will refer to the same or corresponding hardware blocks, software blocks, or functional blocks, if not differently described.

FIG. 25 illustrates a communication system 10 applied to the present disclosure.

Referring to 25, a communication system 10 applied to the present disclosure includes a wireless device, a BS, and a network. Here, the wireless device may mean a device that performs communication by using a wireless access technology (e.g., 5G New RAT (NR) or Long Term Evolution (LTE)) and may be referred to as a communication/wireless/5G device. Although not limited thereto, the wireless device may include a robot 1000a, vehicles 1000b-1 and 1000b-2, an eXtended Reality (XR) device 1000c, a hand-held device 1000d, a home appliance 1000e, an Internet of Thing (IoT) device 1000f, and an AI device/server 4000. For example, the vehicle may include a vehicle with a wireless communication function, an autonomous vehicle, a vehicle capable of performing inter-vehicle communication, and the like. Further, the vehicle may include an unmanned aerial vehicle (UAV) (e.g., drone). The XR device may include an augmented reality (AR)/virtual reality (VR)/mixed reality (MR) device and may be implemented as a head-mounted device (HMD), a head-up display (HUD) provided in the vehicle, a television, a smart phone, a computer, a wearable device, a home appliance device, digital signage, a vehicle, a robot, etc. The hand-held device may include a smart phone, a smart pad, a wearable device (e.g., a smart watch, a smart glass), a computer (e.g., a notebook, etc.), and the like. The home appliance device may include a TV, a refrigerator, a washing machine, and the like. The IoT device may include a sensor, a smart meter, and the like. For example, the base station and the network may be implemented even as the wireless device, and a specific wireless device 2000a may operate as a base station/network node for other wireless devices.

The wireless devices 1000a to 1000f may be connected to a network 3000 over a base station 2000. An artificial intelligence (AI) technology may be applied to the wireless devices 1000a to 1000f, and the wireless devices 1000a to 1000f may be connected to the AI server 4000 over the network 3000. The network 3000 may be comprised using a 3G network, a 4G (e.g., LTE) network, or a 5G (e.g., NR) network. The wireless devices 1000a to 1000f may communicate with each other over the base station 2000/network 3000, but may directly communicate with each other without going through the base station/network (sidelink communication). For example, the vehicles 1000b-1 and 1000b-2 may perform direct communication (e.g., Vehicle to Vehicle (V2V)/Vehicle to everything (V2X) communication). Further, the IoT device (e.g., sensor) may perform direct communication with other IoT devices (e.g., sensor) or other wireless devices 1000a to 1000f.

Wireless communications/connections 1500a, 1500b, and 1500c may be made between the wireless devices 1000a to 1000f and the base station 2000 and between the base station 2000 and the base station 2000. The wireless communication/connection may be made through various wireless access technologies (e.g., 5G NR) such as uplink/downlink communication 1500a, sidelink communication 1500b (or D2D communication), and inter-base station communication 1500c (e.g., relay, integrated access backhaul (JAB)). The wireless device and the base station/the wireless device and the base station and the base station may transmit/receive radio signals to/from each other through wireless communications/connections 1500a, 1500b, and 1500c. For example, the wireless communications/connections 1500a, 1500b, and 1500c may transmit/receive signals on various physical channels. To this end, based on various descriptions of the present disclosure, at least some of various configuration information setting processes, various signal processing processes (e.g., channel encoding/decoding, modulation/demodulation, resource mapping/de-mapping, etc.), a resource allocation process, etc. for transmission/reception of the radio signal may be performed.

Example of Wireless Device to which the Present Disclosure is Applied

FIG. 26 illustrates a wireless device applicable to the present disclosure.

Referring to FIG. 26, a first wireless device 1000 and a second wireless device 2000 may transmit and receive radio signals through various wireless access technologies (e.g., LTE and NR). The first wireless device 1000 and the second wireless device 2000 may correspond to the wireless device 1000x and the base station 2000 and/or the wireless device 1000x and the wireless device 1000x of FIG. 21.

The first wireless device 1000 may include one or more processors 1020 and one or more memories 1040 and may further include one or more transceivers 1060 and/or one or more antennas 1080. The processor 1020 may control the memory 1040 and/or the transceiver 1060 and may be configured to implement descriptions, functions, procedures, proposals, methods, and/or operation flows described in the present disclosure. For example, the processor 1020 may process information in the memory 1040 and generate first information/signal and then transmit a radio signal including the first information/signal through the transceiver 1060. Further, the processor 1020 may receive a radio signal including second information/signal through the transceiver 1060 and then store in the memory 1040 information obtained from signal processing of the second information/signal. The memory 1040 may be connected to the processor 1020 and store various information related to an operation of the processor 1020. For example, the memory 1040 may store a software code including instructions for performing some or all of processes controlled by the processor 1020 or performing the descriptions, functions, procedures, proposals, methods, and/or operation flowcharts described in the present disclosure. The processor 1020 and the memory 1040 may be a part of a communication modem/circuit/chip designed to implement the wireless communication technology (e.g., LTE and NR). The transceiver 1060 may be connected to the processor 1020 and may transmit and/or receive the radio signals through one or more antennas 1080. The transceiver 1060 may include a transmitter and/or a receiver. The transceiver 1060 may be mixed with a radio frequency (RF) unit. In the present disclosure, the wireless device may mean the communication modem/circuit/chip.

The second wireless device 2000 may include one or more processors 2020 and one or more memories 2040 and may further include one or more transceivers 2060 and/or one or more antennas 2080. The processor 2020 may control the memory 2040 and/or the transceiver 2060 and may be configured to implement descriptions, functions, procedures, proposals, methods, and/or operation flows described in the present disclosure. For example, the processor 2020 may process information in the memory 2040 and generate third information/signal and then transmit a radio signal including the third information/signal through the transceiver 2060. Further, the processor 2020 may receive a radio signal including fourth information/signal through the transceiver 2060 and then store in the memory 2040 information obtained from signal processing of the fourth information/signal. The memory 2040 may be connected to the processor 2020 and store various information related to an operation of the processor 2020. For example, the memory 2040 may store a software code including instructions for performing some or all of processes controlled by the processor 2020 or performing the descriptions, functions, procedures, proposals, methods, and/or operation flowcharts described in the present disclosure. The processor 2020 and the memory 2040 may be a part of a communication modem/circuit/chip designated to implement the wireless communication technology (e.g., LTE and NR). The transceiver 2060 may be connected to the processor 2020 and may transmit and/or receive the radio signals through one or more antennas 2080. The transceiver 2060 may include a transmitter and/or a receiver, and the transceiver 2060 may be mixed with the RF unit. In the present disclosure, the wireless device may mean the communication modem/circuit/chip.

Hereinafter, hardware elements of the wireless devices 1000 and 2000 will be described in more detail. Although not limited thereto, one or more protocol layers may be implemented by one or more processors 1020 and 2020. For example, one or more processors 1020 and 2020 may implement one or more layers (e.g., functional layers such as PHY, MAC, RLC, PDCP, RRC, and SDAP). One or more processors 1020 and 2020 may generate one or more protocol data units (PDUs) and/or one or more service data units (SDUs) according to the descriptions, functions, procedures, proposals, methods, and/or operation flowcharts described in the present disclosure. One or more processors 1020 and 2020 may generate a message, control information, data, or information according to the descriptions, functions, procedures, proposals, methods, and/or operation flowcharts described in the present disclosure. One or more processors 1020 and 2020 may generate a signal (e.g., a baseband signal) including the PDU, the SDU, the message, the control information, the data, or the information according to the function, the procedure, the proposal, and/or the method described in the present disclosure and provide the generated signal to one or more transceivers 1060 and 2060. One or more processors 1020 and 2020 may receive the signal (e.g. baseband signal) from one or more transceivers 1060 and 2060 and acquire the PDU, the SDU, the message, the control information, the data, or the information according to the descriptions, functions, procedures, proposals, methods, and/or operation flowcharts described in the present disclosure.

One or more processors 1020 and 2020 may be referred to as a controller, a microcontroller, a microprocessor, or a microcomputer. One or more processors 1020 and 2020 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 1020 and 2020. The descriptions, functions, procedures, proposals, and/or operation flowcharts described in the present disclosure may be implemented by using firmware or software and the firmware or software may be implemented to include modules, procedures, functions, and the like. Firmware or software configured to perform the descriptions, functions, procedures, proposals, and/or operation flowcharts described in the present disclosure may be included in one or more processors 1020 and 2020 or stored in one or more memories 1040 and 2040 and driven by one or more processors 1020 and 2020. The descriptions, functions, procedures, proposals, and/or operation flowcharts described in the present disclosure may be implemented by using firmware or software in the form of a code, the instruction and/or a set form of the instruction.

One or more memories 1040 and 2040 may be connected to one or more processors 1020 and 2020 and may store various types of data, signals, messages, information, programs, codes, indications and/or instructions. One or more memories 1040 and 2040 may be comprised of a ROM, a RAM, an EPROM, a flash memory, a hard drive, a register, a cache memory, a computer reading storage medium and/or a combination thereof. One or more memories 1040 and 2040 may be positioned inside and/or outside one or more processors 1020 and 2020. Further, one or more memories 1040 and 2040 may be connected to one or more processors 1020 and 2020 through various technologies such as wired or wireless connection.

One or more transceivers 1060 and 2060 may transmit to one or more other devices user data, control information, a wireless signal/channel, etc., mentioned in the methods and/or operation flowcharts of the present disclosure. One or more transceivers 1060 and 2060 may receive from one or more other devices user data, control information, a wireless signal/channel, etc., mentioned in the descriptions, functions, procedures, proposals, methods, and/or operation flowcharts described in the present disclosure. For example, one or more transceivers 1060 and 2060 may be connected to one or more processors 1020 and 2020 and transmit and receive the radio signals. For example, one or more processors 1020 and 2020 may control one or more transceivers 1060 and 2060 to transmit the user data, the control information, or the radio signal to one or more other devices. Further, one or more processors 1020 and 2020 may control one or more transceivers 1060 and 2060 to receive the user data, the control information, or the radio signal from one or more other devices. Further, one or more transceivers 1060 and 2060 may be connected to one or more antennas 1080 and 2080, and one or more transceivers 1060 and 2060 may be configured to transmit and receive the user data, control information, wireless signal/channel, etc., mentioned in the descriptions, functions, procedures, proposals, methods, and/or operation flowcharts described in the present disclosure through one or more antennas 1080 and 2080. In the present disclosure, one or more antennas may be a plurality of physical antennas or a plurality of logical antennas (e.g., antenna ports). One or more transceivers 1060 and 2060 may convert the received radio signal/channel from an RF band signal into a baseband signal, in order to process the received user data, control information, radio signal/channel, etc., using one or more processors 1020 and 2020. One or more transceivers 1060 and 2060 may convert the user data, control information, radio signal/channel, etc., processed using one or more processors 1020 and 2020, from the baseband signal into the RF band signal. To this end, one or more transceivers 1060 and 2060 may include an (analog) oscillator and/or filter.

Example of Signal Processing Circuit to which the Present Disclosure is Applied

FIG. 27 illustrates a signal processing circuit for a transmission signal.

Referring to FIG. 27, a signal processing circuit 10000 may include a scrambler 10100, a modulator 10200, a layer mapper 10300, a precoder 10400, a resource mapper 10500, and a signal generator 10600. Although not limited thereto, an operation/function of FIG. 27 may be performed by the processors 1020 and 2020 and/or the transceivers 1060 and 2060 of FIG. 26. Hardware elements of FIG. 27 may be implemented in the processors 1020 and 2020 and/or the transceivers 1060 and 2060 of FIG. 26. For example, blocks 10100 to 10600 may be implemented in the processors 1020 and 2020 of FIG. 26. Further, blocks 10100 to 10500 may be implemented in the processors 1020 and 2020 of FIG. 26, and the block 10600 may be implemented in the transceivers 1060 and 2060 of FIG. 26.

A codeword may be transformed into a radio signal via the signal processing circuit 10000 of FIG. 27. The codeword is an encoded bit sequence of an information block. The information block may include transport blocks (e.g., a UL-SCH transport block, a DL-SCH transport block, etc.). The radio signal may be transmitted on various physical channels (e.g., PUSCH, PDSCH, etc).

Specifically, the codeword may be transformed into a bit sequence scrambled by the scrambler 10100. A scramble sequence used for scrambling may be generated based on an initialization value, and the initialization value may include ID information, etc. of a wireless device. The scrambled bit sequence may be modulated into a modulated symbol sequence by the modulator 10200. A modulation scheme may include pi/2-binary phase shift keying (BPSK), m-phase shift keying (PSK), m-quadrature amplitude modulation (QAM), etc. A complex modulated symbol sequence may be mapped to one or more transport layers by the layer mapper 10300. Modulated symbols of each transport layer may be mapped to a corresponding antenna port(s) by the precoder 10400 (precoding). An output z of the precoder 10400 may be obtained by multiplying an output y of the layer mapper 10300 by a precoding matrix W of N*M, where N is the number of antenna ports, and M is the number of transport layers. The precoder 10400 may perform precoding after performing transform precoding (e.g., DFT transform) on complex modulated symbols. Further, the precoder 10400 may perform the precoding without performing the transform precoding.

The resource mapper 10500 may map the modulated symbols of each antenna port to time-frequency resources. The time-frequency resources may include a plurality of symbols (e.g., CP-OFDMA symbol and DFT-s-OFDMA symbol) in a time domain and include a plurality of subcarriers in a frequency domain. The signal generator 10600 may generate the radio signal from the mapped modulated symbols, and the generated radio signal may be transmitted to another device over each antenna. To this end, the signal generator 10600 may include an inverse fast Fourier transform (IFFT) module, a cyclic prefix (CP) insertor, a digital-to-analog converter (DAC), a frequency uplink converter, and the like.

A signal processing process for a received signal in the wireless device may be configured in the reverse of the signal processing processes 10100 to 10600 of FIG. 27. For example, the wireless device (e.g., 1000 and 2000 of FIG. 26) may receive the radio signal from the outside through the antenna port/transceiver. The received radio signal may be converted into a baseband signal through a signal reconstructor. To this end, the signal reconstructor may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Utilization Example of Wireless Device to which the Present Disclosure is Applied FIG. 28 illustrates another example of a wireless device applied to the present disclosure.

The wireless device may be implemented in various types of devices according to usage examples/services.

Referring to FIG. 28, wireless devices 1000 and 2000 may correspond to the wireless devices 1000 and 2000 of FIG. 26 and may be comprised of various elements, components, units, and/or modules. For example, the wireless devices 1000 and 2000 may include a communication unit 1100, a control unit 1200, and a memory unit 1300, and an additional element 1400. The communication unit 1100 may include a communication circuit 1120 and a transceiver(s) 1140. For example, the communication circuit 1120 may include one or more processors 1020 and 2020 and/or one or more memories 1040 and 2040 of FIG. 26. For example, the transceiver(s) 1140 may include one or more transceivers 1060 and 2060 and/or one or more antennas 1080 and 2080 of FIG. 26. The control unit 1200 is electrically connected to the communication unit 1100, the memory unit 1300, and the additional element 1400 and controls an overall operation of the wireless device. For example, the control unit 1200 may an electrical/mechanical operation of the wireless device based on a program/code/instruction/information stored in the memory unit 1300. Further, the control unit 1200 may transmit the information stored in the memory unit 1300 to the outside (e.g., other communication devices) through the communication unit 1100 via a wireless/wired interface, or store information received from the outside (e.g., other communication devices) via the wireless/wired interface through the communication unit 1100.

The additional element 1400 may be variously configured according to the type of wireless device. For example, the additional element 1400 may include at least one of a power unit/battery, an input/output (I/O) unit, a driving unit, and a computing unit. Although not limited thereto, the wireless device may be implemented as a form such as the robot 1000*a* of FIG. 25, the vehicles 1000*b*-1 and 1000*b*-2 of FIG. 25, the XR device 1000*c* of FIG. 25, the portable device 1000*d* of FIG. 25, the home appliance 1000*e* of FIG. 25, the IoT device 1000*f* of FIG. 25, a digital broadcasting terminal, a hologram device, a public safety device, an MTC device, a medical device, a FinTech device (or financial device), a security device, a climate/environment device, an AI server/device 4000 of FIG. 25, the base station 2000 of FIG. 25, a network node, etc. The wireless device may be movable or may be used at a fixed place according to use examples/services.

In FIG. 28, all of various elements, components, units, and/or modules in the wireless devices 1000 and 2000 may be interconnected via the wired interface or at least may be wirelessly connected through the communication unit 1100. For example, the control unit 1200 and the communication 1100 in the wireless devices 1000 and 2000 may be wiredly connected and the control unit 1200 and the first unit (e.g., 1300 or 1400) may be wirelessly connected through the communication unit 1100. Further, each element, component, unit, and/or module in the wireless devices 1000 and 2000 may further include one or more elements. For example, the control unit 1200 may be constituted by one or more processor sets. For example, the control unit 1200 may be configured a set of a communication control processor, an application processor, an electronic control unit (ECU), a graphic processing processor, a memory control processor, etc. As another example, the memory unit 1300 may be configured as a random access memory (RAM), a dynamic RAM (DRAM), a read only memory (ROM), a flash memory, a volatile memory, a non-volatile memory, and/or combinations thereof.

FIG. 29 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a mobile station (MS), a user terminal (UT), a mobile subscriber station (MSS), a sub-scriber station (SS), an advanced mobile station (AMS), or a wireless terminal (WT).

Referring to FIG. 29, a portable device 1000 may include an antenna unit 1080, a communication unit 1100, a control unit 1200, a memory unit 1300, a power supply unit 1400*a*, an interface unit 1400*b*, and an input/output unit 1400*c*. The antenna unit 1080 may be configured as apart of the communication unit 1100. The blocks 1100 to 1300/1400*a* to 1400*c* correspond to the blocks 1100 to 1300/1400 of FIG. 28, respectively.

The communication unit 1100 may transmit/receive a signal (e.g., data, a control signal, etc.) to/from other wireless devices and base stations. The control unit 1200 may perform various operations by controlling components of the portable device 1000. The control unit 1200 may include an application processor (AP). The memory unit 1300 may store data/parameters/programs/codes/instructions required for driving the portable device 1000. Further, the memory unit 1300 may store input/output data/information, etc. The power supply unit 1400*a* may supply power to the portable device 1000 and include a wired/wireless charging circuit, a battery, and the like. The interface unit 1400*b* may support a connection between the portable device 1000 and another external device. The interface unit 1400b may include various ports (e.g., an audio input/output port, a video input/output port) for the connection with the external device. The input/output unit 1400c may receive or output a video information/signal, an audio information/signal, data, and/or information input from a user. The input/output unit 1400c may include a camera, a microphone, a user input unit, a display 1400d, a speaker, and/or a haptic module.

For example, in the case of data communication, the input/output unit 1400c may acquire information/signal (e.g., touch, text, voice, image, video, etc.) input from the user, and the acquired information/signal may be stored in the memory unit 1300. The communication unit 1100 may transform the information/signal stored in the memory into the radio signal and directly transmit the radio signal to another wireless device or transmit the radio signal to the base station. Further, the communication unit 1100 may receive the radio signal from another wireless device or base station and then reconstruct the received radio signal into original information/signal. The reconstructed information/signal may be stored in the memory unit 1300 and then output in various forms (e.g., text, voice, image, video, haptic) through the input/output unit 1400c.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The method of reporting beam information (first beam information, second beam information) in the wireless communication system of the present disclosure has been described focusing on examples applied to the 3GPP LTE/LTE-A system and the 5G system (New RAT system), but in addition to that, it is possible to apply to various wireless communication systems.

The invention claimed is:

1. A method of reporting, by a user equipment (UE), beam information in a wireless communication system, the method comprising:
   receiving downlink control information for triggering a beam report from a base station;
   receiving a beam report-related resource from the base station; and
   reporting first beam information or second beam information to the base station based on the beam report-related resource,
   wherein the first beam information includes an indicator of the beam report-related resource, received power information, and noise and interference information, and is reported based on a first minimum required time for the beam report,
   wherein the second beam information includes the indicator of the beam report-related resource, and the noise and interference information, and is reported based on a second minimum required time for the beam report, and
   wherein the first minimum required time is based on a value obtained by adding 1 symbol to the second minimum required time.

2. The method of claim 1, wherein the first minimum required time has a value greater than the second minimum required time.

3. The method of claim 1,
   wherein the received power information includes reference signal received power (RSRP), and
   wherein the noise and interference information includes a signal to interference noise ratio (SINR).

4. The method of claim 1, wherein the beam report-related resource is a channel state information-reference signal (CSI-RS) resource or a synchronization signal block (SSB) resource.

5. The method of claim 1, wherein the beam report is an aperiodic beam report.

6. A user equipment (UE) configured to report beam information in a wireless communication system, the UE comprising:
   at least one transceiver;
   at least one processor operably connectable to the at least one transceiver; and
   at least one computer memory operably connectable to the at least one processor and storing instructions that, based on being executed by the at least one processor, perform operations comprising:
   receiving downlink control information for triggering a beam report from a base station;
   receiving a beam report-related resource from the base station; and reporting first beam information or second beam information to the base station based on the beam report-related resource, wherein the first beam information includes an indicator of the beam report-related resource, received power information, and noise and interference information, and is reported based on a first minimum required time for the beam report, wherein the second beam information includes the indicator of the beam report-related resource, and the noise and interference information, and is reported based on a second minimum required time for the beam report, and wherein the first minimum required time is based on a value obtained by adding 1 symbol to the second minimum required time.

7. The UE of claim 6, wherein the first minimum required time has a value greater than the second minimum required time.

8. The UE of claim 6,
wherein the received power information includes reference signal received power (RSRP), and
wherein the noise and interference information includes a signal to interference noise ratio (SINR).

9. The UE of claim 6, wherein the beam report-related resource is a channel state information-reference signal (CSI-RS) resource or a synchronization signal block (SSB) resource.

10. The UE of claim 6, wherein the beam report is an aperiodic beam report.

11. A processing apparatus configured to control a user equipment (UE) to report beam information in a wireless communication system, the processing apparatus comprising:

at least one processor; and at least one computer memory operably connectable to the at least one processor and storing instructions that, based on being executed by the at least one processor, perform operations comprising:

receiving downlink control information for triggering a beam report from a base station;

receiving a beam report-related resource from the base station; and reporting first beam information or second beam information to the base station based on the beam report-related resource, wherein the first beam information includes an indicator of the beam report-related resource, received power information, and noise and interference information, and is reported based on a first minimum required time for the beam report, wherein the second beam information includes the indicator of the beam report-related resource, and the noise and interference information, and is reported based on a second minimum required time for the beam report, and wherein the first minimum required time is based on a value obtained by adding 1 symbol to the second minimum required time.

* * * * *